US008539093B2

(12) United States Patent
Forstall et al.

(10) Patent No.: US 8,539,093 B2
(45) Date of Patent: Sep. 17, 2013

(54) PORT DISCOVERY AND MESSAGE DELIVERY IN A PORTABLE ELECTRONIC DEVICE

(75) Inventors: Scott Forstall, Mountain View, CA (US); Nitin K. Ganatra, San Jose, CA (US); Dan Keen, Sunnyvale, CA (US)

(73) Assignee: Apple Inc., Cupertino, CA (US)

( * ) Notice: Subject to any disclaimer, the term of this patent is extended or adjusted under 35 U.S.C. 154(b) by 1138 days.

(21) Appl. No.: 11/968,076

(22) Filed: Dec. 31, 2007

(65) Prior Publication Data

US 2009/0006644 A1    Jan. 1, 2009

Related U.S. Application Data

(60) Provisional application No. 60/947,396, filed on Jun. 29, 2007, provisional application No. 60/937,993, filed on Jun. 29, 2007.

(51) Int. Cl.
*G06F 15/16* (2006.01)
*H04L 9/00* (2006.01)

(52) U.S. Cl.
USPC .......... 709/232; 709/206; 709/220; 709/203; 709/224; 709/227; 709/228; 709/225; 709/226; 713/153; 713/170; 713/155; 713/156; 713/158

(58) Field of Classification Search
USPC ............... 709/232, 206, 220, 203, 224, 227, 709/228, 226, 225
See application file for complete search history.

(56) References Cited

U.S. PATENT DOCUMENTS

| 4,598,363 | A  | 7/1986 | Clark et al. ............... 364/200 |
| 6,449,663 | B1 | 9/2002 | Carney et al. .............. 710/15 |
| 6,449,726 | B1 | 9/2002 | Smith .................... 713/340 |
| 7,640,427 | B2* | 12/2009 | Callas et al. .............. 713/153 |
| 2001/0055127 | A1 | 12/2001 | Wakabayashi .............. 358/305 |
| 2004/0059819 | A1 | 3/2004 | Hardcastle ............... 709/227 |

(Continued)

FOREIGN PATENT DOCUMENTS

WO    WO 02/49373    6/2002

OTHER PUBLICATIONS

Vanemery ("Simple Mail Transfer Protocol", 14, Feb. 2005, http://web.archive.org/web/*/http://www.vanemery.com/Protocols/SMTP/smtp.html, pp. 1-12).*

(Continued)

*Primary Examiner* — Jude Jean Gilles
(74) *Attorney, Agent, or Firm* — Womble Carlyle Sandridge & Rice LLP

(57) ABSTRACT

In accordance with some embodiments, a computer-implemented method for fetching email from an email server to a portable electronic device is disclosed. The method includes, at a portable electronic device configured with an email client: (1) when creating an email account on the portable electronic device: (a) attempting to connect to an outbound email server using a first port/security combination according to a first preferred sequence of port/security combinations; (b) if connection is made using the first port/security combination, storing the first port/security combination as a stored configuration for the email account; (c) if connection is not made using the first port/security combination, repeating (1)(a) for different port/security combinations according to the preferred sequence until connection is made with a second port/security combination; and (d) storing the second port/security combination as the stored configuration; and (2) subsequently employing the stored configuration to connect to and send email via the outbound email server.

20 Claims, 14 Drawing Sheets

(56) References Cited

U.S. PATENT DOCUMENTS

| | | | |
|---|---|---|---|
| 2005/0055443 A1 | 3/2005 | Tosey et al. | 709/225 |
| 2005/0193064 A1* | 9/2005 | Hales | 709/206 |
| 2005/0221834 A1* | 10/2005 | Kangas et al. | 455/452.1 |
| 2006/0059239 A1 | 3/2006 | Kouznetsov et al. | 709/206 |
| 2006/0197753 A1 | 9/2006 | Hotelling | 345/173 |
| 2006/0200524 A1* | 9/2006 | Costenaro et al. | 709/206 |
| 2007/0106739 A1 | 5/2007 | Clark et al. | 709/206 |
| 2007/0127645 A1 | 6/2007 | Bloebaum et al. | 379/93.09 |
| 2008/0242370 A1 | 10/2008 | Lando et al. | 455/574 |
| 2008/0256193 A1 | 10/2008 | Kamat | 709/206 |
| 2010/0174796 A1 | 7/2010 | Fleck et al. | 709/206 |

OTHER PUBLICATIONS

Hoffman, "SMTP Service Extension for Secure SMTP over TLS," Paul Hoffman Internet Mail Consortium, IETF, CH, No. 3, Jul. 6, 2000, draft-hoffman-rfc2487bis-03.txt.

International Search Report and Written Opinion for International Application No. PCT/US2008/050088, mailed Sep. 30, 2008.

International Search Report and Written Opinion for International Application No. PCT/US2008/050085, mailed Dec. 15, 2008.

International Preliminary Report on Patentablility, mailed Jan. 14, 2010, received in International Application No. PCT/US2008/050088, which corresponds to U.S. Appl. No. 11/968,076.

International Preliminary Report on Patentablility, mailed Jan. 14, 2010, received in International Application No. PCT/US2008/050085, which corresponds to U.S. Appl. No. 11/968,070.

Office Action dated Jun. 24, 2010, received in U.S. Appl. No. 11/968,070.

Office Action dated Jul. 30, 2010, received in Australian Patent Application No. 2008271011, which corresponds to U.S. Appl. No. 11/968,076.

Office Action dated May 27, 2010, received in European Application No. 08 713 445.8, which corresponds to U.S. Appl. No. 11/968,076.

Mate, J., "SSL versus TLS versus STARTTLS," sial.org, Jun. 21, 2007, http://sial.org/howto/openssl/tls-name/.

Tufts, "Changing SMTP Port 25 to Port 465 or 587 in Tufts Supported Mail Clients," Tufts University Information Technology Training & Documentation Department, 14 pages, http://uit.tufts.edu/downloads/ChangingSMTPPort25toPort465or587.pdf, Sep. 27, 2007.

Chinese Office Action dated Aug. 6, 2012, Application No. 200880020377.6.

Final Office Action dated Dec. 10, 2010, received in U.S. Appl. No. 11/968,070, 15 pages (Forstall).

Office Action dated Oct. 31, 2011, received in Australian Patent Application No. 2008271011, which corresponds to U.S. Appl. No. 11/968,076, 3 pages (Forstall).

Office Action dated Dec. 2, 2011, received in Chinese Patent Application No. 200880020377.6, which corresponds to U.S. Appl. No. 11/968,076, 4 pages (Forstall).

* cited by examiner

E-mail Client Module 140
(Email Application)

| E-Mail Client Code | 172 |
|---|---|
| Email Front End | 173 |
| Autofetch | 174 |
| Port Discovery | 175 |
| E-Mail Client Data | 180 |
| Autofetch Settings | 181 |
| First Period | 182-1 |
| Second Period | 182-2 |
| Third Period | 182-3 |
| Fourth Period | 182-4 |
| Predefined Values | 182-5 |
| Autofetch Flag (YES, NO) | 183 |
| Port/Security Settings | 184 |
| Stored Configuration | 185 |
| Port Number | 186 |
| Security Level | 187 |
| Validation Sequence | 188 |
| Fallback Sequence | 190 |
| Account Information | 191 |

E.g., 182-5
15 min
30 min
60 min
never

E.g., 188
587 / SSL,
587 / STARTTLS,
25 / SSL,
25 / STARTTLS,
465 / SSL,
465 / STARTTLS,
587 / no SSL or STARTTLS,
25 / no SSL or STARTTLS,
465 / no SSL or STARTTLS.

E.g., 190
587 / no SSL or STARTTLS
25 / no SSL or STARTTLS
465 / no SSL or STARTTLS
587 / SSL
587 / STARTTLS,
25 / SSL,
25 / STARTTLS,
465 / SSL,
465 / STARTTLS,

Figure 1C

E-mail Client Module 140

| E-Mail Client Code | 172 |
|---|---|
| Email Application | 173 |
| Autofetch | 174 |
| Port Discovery | 175 |

| E-Mail Client Data | 180 |
|---|---|

| Autofetch Settings | 181 |
|---|---|
| First Period | 182-1 |
| Second Period | 182-2 |
| Third Period | 182-3 |
| Fourth Period | 182-4 |
| Predefined Values | 182-5 |
| Autofetch Flag | 183 |

| Port/Security Settings | 184 |
|---|---|
| Stored Configuration | 185 |
|   Port Number | 186 |
|   Security Level | 187 |
| Validation Sequence | 188 |
| Fallback Collection | 192 |
|   First Fallback Seq | 194-1 |
|   Second Fallback Seq | 194-2 |
|   Third Fallback Seq | 194-3 |
|   Fourth Fallback Seq | 194-4 |
|   Fifth Fallback Seq | 194-5 |
|   Sixth Fallback Seq | 194-6 |
|   Seventh Fallback Seq | 194-7 |
|   Eighth Fallback Seq | 194-8 |
|   Ninth Fallback Seq | 194-9 |

E.g., Fallback Sequence when Stored Config. = 25 / STARTTLS

```
587 / no SSL or STARTTLS
25  / no SSL or STARTTLS
465 / no SSL or STARTTLS
587 / SSL
587 / STARTTLS,
25  / SSL,
25  / STARTTLS,
465 / SSL,
465 / STARTTLS,
```

Figure 1D

PORT DISCOVERY AND MESSAGE DELIVERY IN A PORTABLE ELECTRONIC DEVICE

RELATED APPLICATIONS

This application claims priority to U.S. Provisional Patent Application No. 60/947,396, "Port Discovery and Message Delivery in a Portable Electronic Device," filed Jun. 29, 2007; and 60/937,993, "Portable Multifunction Device," filed Jun. 29, 2007. Both of these applications are incorporated by reference herein in their entirety.

This application is related to the following applications: (1) U.S. patent application Ser. No. 10/188,182, "Touch Pad For Handheld Device," filed Jul. 1, 2002; (2) U.S. patent application Ser. No. 10/722,948, "Touch Pad For Handheld Device," filed Nov. 25, 2003; (3) U.S. patent application Ser. No. 10/643,256, "Movable Touch Pad With Added Functionality," filed Aug. 18, 2003; (4) U.S. patent application Ser. No. 10/654,108, "Ambidextrous Mouse," filed Sep. 2, 2003; (5) U.S. patent application Ser. No. 10/840,862, "Multipoint Touchscreen," filed May 6, 2004; (6) U.S. patent application Ser. No. 10/903,964, "Gestures For Touch Sensitive Input Devices," filed Jul. 30, 2004; (7) U.S. patent application Ser. No. 11/038,590, "Mode-Based Graphical User Interfaces For Touch Sensitive Input Devices" filed Jan. 18, 2005; (8) U.S. patent application Ser. No. 11/057,050, "Display Actuator," filed Feb. 11, 2005; (9) U.S. Provisional Patent Application No. 60/658,777, "Multi-Functional Hand-Held Device," filed Mar. 4, 2005; (10) U.S. patent application Ser. No. 11/367,749, "Multi-Functional Hand-Held Device," filed Mar. 3, 2006; (11) U.S. Provisional Patent Application No. 60/824,769, "Portable Multifunction Device," filed Sep. 6, 2006; (12) U.S. Provisional Patent Application No. 60/879,253, "Portable Multifunction Device," filed Jan. 7, 2007; (13) U.S. Provisional Patent Application No. 60/879,469, "Portable Multifunction Device," filed Jan. 8, 2007; and (14) U.S. Provisional Patent Application No. 60/947,395, "Email Fetching System and Method in a Portable Electronic Device," filed Jun. 29, 2007. All of these applications are incorporated by reference herein in their entirety.

TECHNICAL FIELD

The disclosed embodiments relate generally to portable electronic devices, and more particularly, to portable devices that access and display email.

BACKGROUND

As portable electronic devices become more compact, and the number of functions performed by a given device increase, it has become a significant challenge to design a user interface that allows users to easily interact with a multifunction device. This challenge is particularly significant for handheld portable devices, which have much smaller screens than desktop or laptop computers. This situation is unfortunate because the user interface is the gateway through which users receive not only content but also responses to user actions or behaviors, including user attempts to access a device's features, tools, and functions. Some portable communication devices (e.g., mobile telephones, sometimes called mobile phones, cell phones, cellular telephones, and the like) have resorted to adding more pushbuttons, increasing the density of push buttons, overloading the functions of pushbuttons, or using complex menu systems to allow a user to access, store and manipulate data. These conventional user interfaces often result in complicated key sequences and menu hierarchies that must be memorized by the user.

Some portable electronic devices provide email capabilities in addition to other features, such as access to and display of online videos, Internet access, media player features, and cell phone capabilities. Prior to using these email capabilities a device must establish a connection to a designated email server that provides email services. A portable electronic device can connect to an email server in two ways: indirectly, via a web server with its own connection to the email server, or directly, via a SMTP connection. A device establishes a direct connection with an email server by specifying for that connection a port and security setting (both of which must be supported by the server). There are many possible combinations of port and security settings that can be defined for a given connection and each of these combinations is associated with a different level of security. Accordingly, it can be confusing for a user to define such settings and, given the number of choices, the user might select for the portable device a combination of settings that is less secure than another possible combination. Moreover, in some instances a prior established connection can become unavailable. In this situation a user would need to reestablish their email connection using a different combination of port and security settings. This can be confusing and result in a less than optimal configuration, for the same reason as the initial connection.

Accordingly, there is a need for a portable electronic device with email capabilities that enables optimal port and security settings to an email server be established with little or no user confusion. There is also a need for a portable electronic device that enables different combinations of port and security settings to be determined for a direct email connection when a connection to the email server cannot be established using prior port and security settings.

SUMMARY

The above deficiencies and other problems associated with user interfaces for portable devices are reduced or eliminated by the disclosed portable multifunction device. In some embodiments, the device has a touch-sensitive display (also known as a "touch screen") with a graphical user interface (GUI), one or more processors, memory and one or more modules, programs or sets of instructions stored in the memory for performing multiple functions. In some embodiments, the user interacts with the GUI primarily through finger contacts and gestures on the touch-sensitive display. In some embodiments, in addition to e-mailing, the functions may include telephoning, video conferencing, instant messaging, blogging, digital photographing, digital videoing, web browsing, digital music playing, and/or digital video playing. Instructions for performing these functions may be included in a computer program product configured for execution by one or more processors.

In accordance with some embodiments, a computer-implemented method is performed at a portable electronic device configured with an email client. The computer-implemented method includes: (1) when creating an email account on the portable electronic device: (a) attempting to connect to an outbound email server using a first port/security combination according to a first preferred sequence of port/security combinations; (b) if connection is made using the first port/security combination, storing the first port/security combination as a stored configuration for the email account; (c) if connection is not made using the first port/security combination, repeating (1)(a) for different port/security combinations according to the preferred sequence until connection is made with a second port/security combination; and (d) storing the second port/security combination as the stored configuration; and (2) subsequently employing the stored configuration to connect to and send email via the outbound email server.

In some embodiments of the computer-implemented method, the stored port/security combinations comprise a plurality of combinations of predefined port numbers and security settings associated with SMTP email servers. In other embodiments, the preferred sequence is arranged from highest to lowest security strength. In other embodiments, the preferred sequence of port/securing setting comprises:

> 587/SSL,
> 587/STARTTLS,
> 25/SSL,
> 25/STARTTLS,
> 465/SSL,
> 465/STARTTLS,
> 587/no SSL or STARTTLS,
> 25/no SSL or STARTTLS,
> 465/no SSL or STARTTLS.

Other embodiments of the computer-implemented method may further comprise: when the portable device cannot subsequently connect to the outbound email server using the stored configuration: (a) attempting to connect to the outbound email server using a first fallback port/security combination according to a fallback sequence of port/security combinations that is different from the first preferred sequence, wherein the first fallback port/security combination is different from the stored configuration; (b) upon determining that connection is made using the first fallback port/security combination, employing the first fallback port/security combination to send email via the outbound email server; (c) upon determining that connection is not made using the first fallback port/security combination, repeating (1)(a) for different port/security combinations according to the fallback sequence until connection is made with a second fallback port/security combination that is different from the stored configuration; and (d) employing the second fallback port/security combination to send email via the outbound email server. Further, in some embodiments, the fallback sequence comprises a reordering of the preferred sequence such that an account configured for email communications using a secure port/security combination does not fallback to a nonsecure port/security combination. In other embodiments, the fallback sequence is further configured such that either of the first or second fallback port/security combinations have less security strength than the stored configuration.

In accordance with some embodiments, a portable computing device includes: a display; one or more processors; memory; and one or more programs, wherein the one or more programs are stored in the memory and configured to be executed by the one or more processors. The one or programs include: an email application; and instructions for setting ports and security level for an email account. These instructions comprise: (1) when creating an email account on the portable electronic device: (a) attempting to connect to an outbound email server using a first port/security combination according to a first preferred sequence of port/security combinations; (b) if connection is made using the first port/security combination, storing the first port/security combination as a stored configuration for the email account; (c) if connection is not made using the first port/security combination, repeating (1)(a) for different port/security combinations according to the preferred sequence until connection is made with a second port/security combination; and (d) storing the second port/security combination as the stored configuration; and (2) subsequently employing the stored configuration to connect to and send email via the outbound email server.

In accordance with some embodiments, a computer readable storage medium stores one or more programs. The one or more programs include instructions, which when executed by a portable computing device with an email client, cause the device to: (1) when creating an email account on the portable electronic device: (a) attempt to connect to an outbound email server using a first port/security combination according to a first preferred sequence of port/security combinations; (b) if connection is made using the first port/security combination, store the first port/security combination as a stored configuration for the email account; (c) if connection is not made using the first port/security combination, repeat (1)(a) for different port/security combinations according to the preferred sequence until connection is made with a second port/security combination; and (d) store the second port/security combination as the stored configuration; and (2) subsequently employ the stored configuration to connect to and send email via the outbound email server.

In accordance with embodiments, a portable electronic device with a touch screen display and an email client comprises means for: (1) when creating an email account on the portable electronic device: (a) attempting to connect to an outbound email server using a first port/security combination according to a first preferred sequence of port/security combinations; (b) if connection is made using the first port/security combination, storing the first port/security combination as a stored configuration for the email account; (c) if connection is not made using the first port/security combination, repeating (1)(a) for different port/security combinations according to the preferred sequence until connection is made with a second port/security combination; and (d) storing the second port/security combination as the stored configuration; and (2) subsequently employing the stored configuration to connect to and send email via the outbound email server.

Thus, a portable electronic device is provided that provides a more efficient and unobtrusive (to the user) system and method for discovering ports and delivering messages to an email server.

BRIEF DESCRIPTION OF THE DRAWINGS

For a better understanding of the aforementioned embodiments of the invention as well as additional embodiments thereof, reference should be made to the Description of Embodiments below, in conjunction with the following drawings in which like reference numerals refer to corresponding parts throughout the figures.

FIGS. 1C and 1D are block diagrams illustrating additional details of the email client module in accordance with some embodiments.

DESCRIPTION OF EMBODIMENTS

Figure 1A:
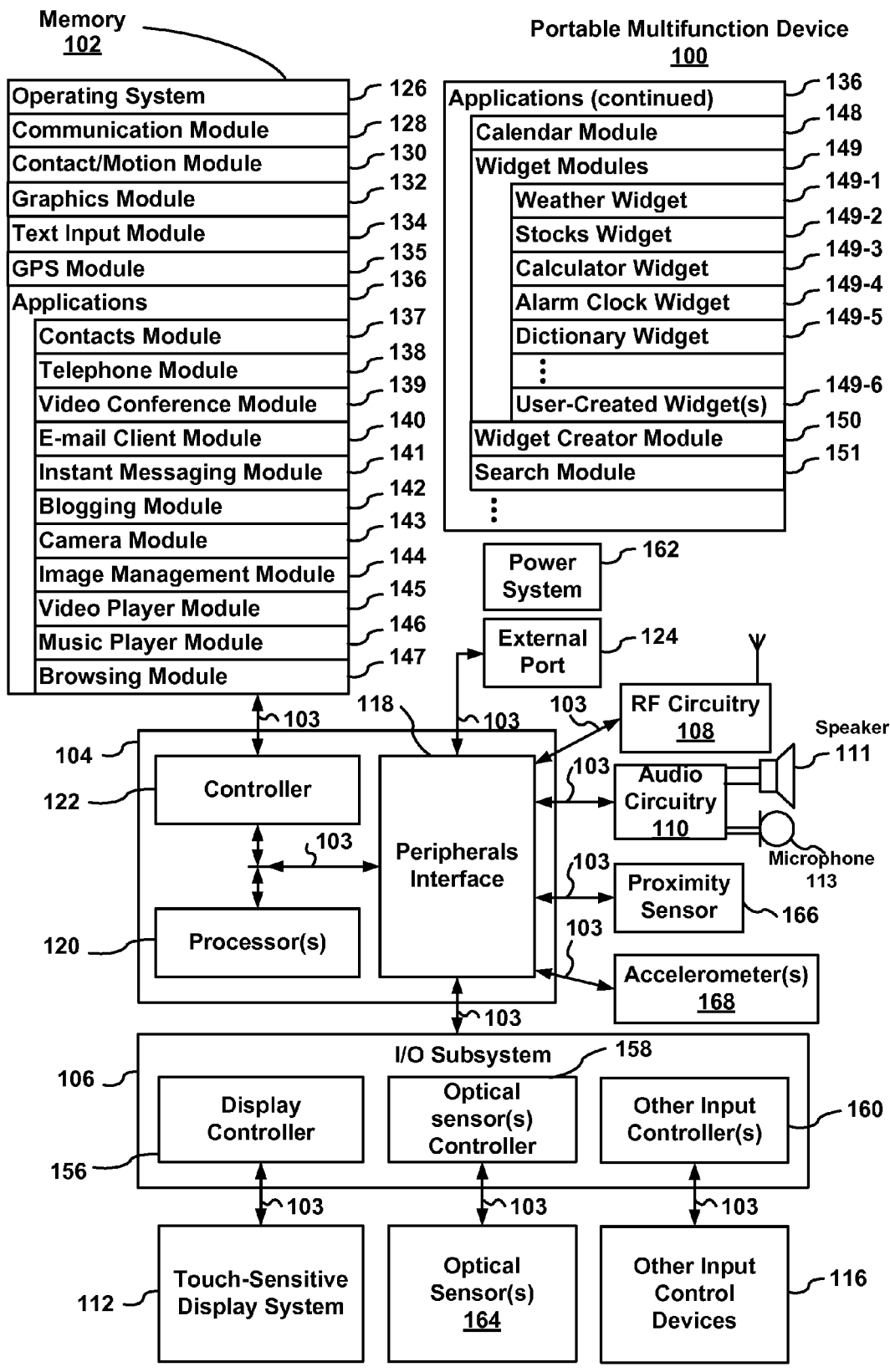
FIGS. 1A and 1B are block diagrams illustrating portable multifunction devices with touch-sensitive displays in accordance with some embodiments.

Reference will now be made in detail to embodiments, examples of which are illustrated in the accompanying drawings. In the following detailed description, numerous specific details are set forth in order to provide a thorough understanding of the present invention. However, it will be apparent to one of ordinary skill in the art that the present invention may be practiced without these specific details. In other instances, well-known methods, procedures, components, circuits, and networks have not been described in detail so as not to unnecessarily obscure aspects of the embodiments.

It will also be understood that, although the terms first, second, etc. may be used herein to describe various elements, these elements should not be limited by these terms. These terms are only used to distinguish one element from another. For example, a first gesture could be termed a second gesture, and, similarly, a second gesture could be termed a first gesture, without departing from the scope of the present invention.

The terminology used in the description of the invention herein is for the purpose of describing particular embodiments only and is not intended to be limiting of the invention. As used in the description of the invention and the appended claims, the singular forms "a", "an" and "the" are intended to include the plural forms as well, unless the context clearly indicates otherwise. It will also be understood that the term "and/or" as used herein refers to and encompasses any and all possible combinations of one or more of the associated listed items. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

Embodiments of a portable multifunction device, user interfaces for such devices, and associated processes for using such devices are described. In some embodiments, the device is a portable communications device such as a mobile telephone that also contains other functions, such as PDA and/or music player functions.

The user interface may include a physical click wheel in addition to a touch screen or a virtual click wheel displayed on the touch screen. A click wheel is a user-interface device that may provide navigation commands based on an angular displacement of the wheel or a point of contact with the wheel by a user of the device. A click wheel may also be used to provide a user command corresponding to selection of one or more items, for example, when the user of the device presses down on at least a portion of the wheel or the center of the wheel. Alternatively, breaking contact with a click wheel image on a touch screen surface may indicate a user command corresponding to selection. For simplicity, in the discussion that follows, a portable multifunction device that includes a touch screen is used as an exemplary embodiment. It should be understood, however, that some of the user interfaces and associated processes may be applied to other devices, such as personal computers and laptop computers, that may include one or more other physical user-interface devices, such as a physical click wheel, a physical keyboard, a mouse and/or a joystick.

The device supports a variety of applications, such as a telephone application, a video conferencing application, an e-mail application, an instant messaging application, a blogging application, a digital camera application, a digital video camera application, a web browsing application, a digital music player application, and/or a digital video player application.

The various applications that may be executed on the device may use at least one common physical user-interface device, such as the touch screen. One or more functions of the touch screen as well as corresponding information displayed on the device may be adjusted and/or varied from one application to the next and/or within a respective application. In this way, a common physical architecture (such as the touch screen) of the device may support the variety of applications with user interfaces that are intuitive and transparent.

The user interfaces may include one or more soft keyboard embodiments. The soft keyboard embodiments may include standard (QWERTY) and/or non-standard configurations of symbols on the displayed icons of the keyboard, such as those described in U.S. patent application Ser. Nos. 11/459,606, "Keyboards For Portable Electronic Devices," filed Jul. 24, 2006, and Ser. No. 11/459,615, "Touch Screen Keyboards For Portable Electronic Devices," filed Jul. 24, 2006, the contents of which are hereby incorporated by reference in their entirety. The keyboard embodiments may include a reduced number of icons (or soft keys) relative to the number of keys in existing physical keyboards, such as that for a typewriter. This may make it easier for users to select one or more icons in the keyboard, and thus, one or more corresponding symbols. The keyboard embodiments may be adaptive. For example, displayed icons may be modified in accordance with user actions, such as selecting one or more icons and/or one or more corresponding symbols. One or more applications on the portable device may utilize common and/or different keyboard embodiments. Thus, the keyboard embodiment used may be tailored to at least some of the applications. In some embodiments, one or more keyboard embodiments may be tailored to a respective user. For example, one or more keyboard embodiments may be tailored to a respective user based on a word usage history (lexicography, slang, individual usage) of the respective user. Some of the keyboard embodiments may be adjusted to reduce a probability of a user error when selecting one or more icons, and thus one or more symbols, when using the soft keyboard embodiments.

Figure 1B:
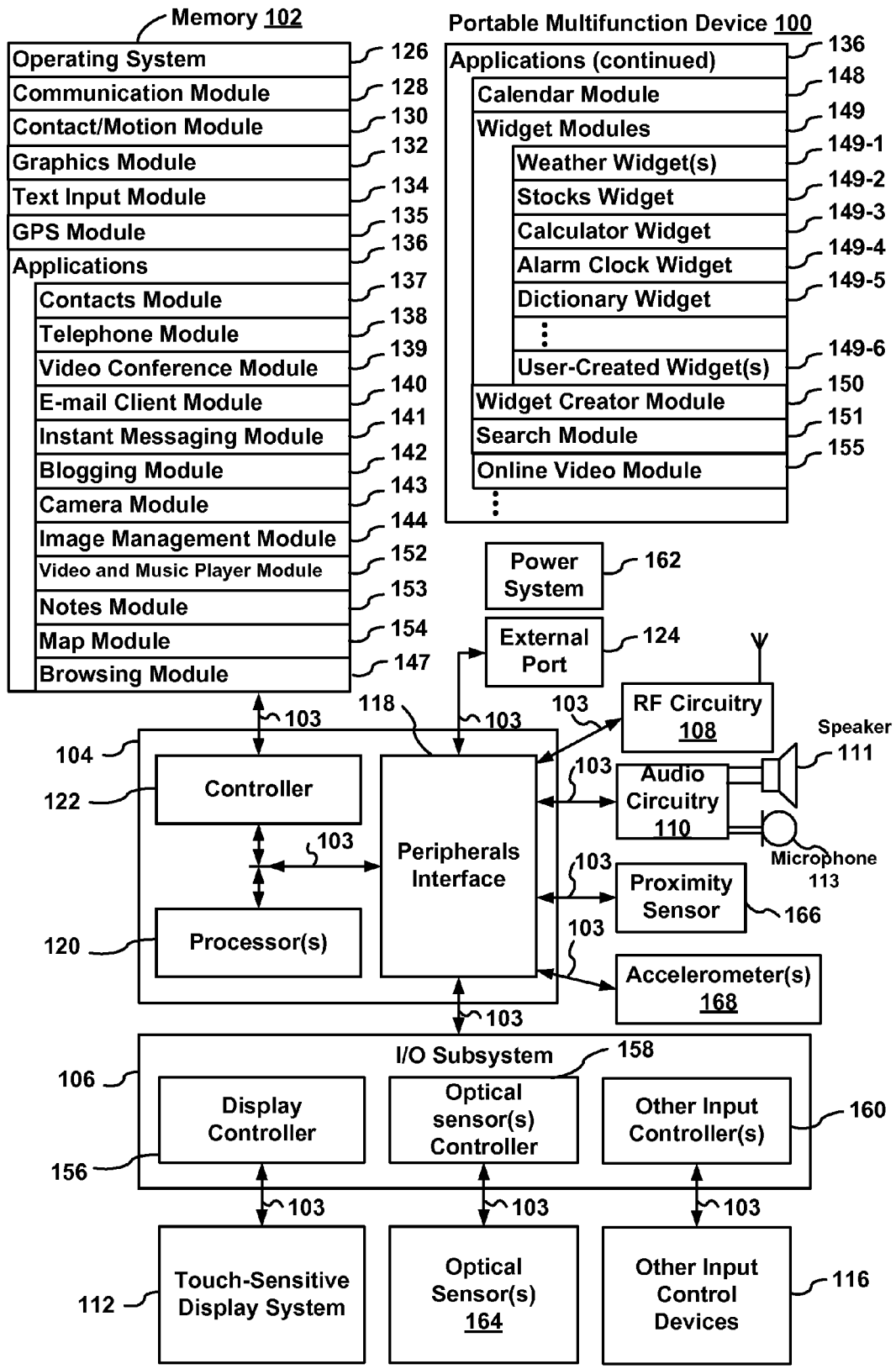

Attention is now directed towards embodiments of the device. FIGS. 1A and 1B are block diagrams illustrating portable multifunction devices 100 with touch-sensitive displays 112 in accordance with some embodiments. The touch-sensitive display 112 is sometimes called a "touch screen" for convenience, and may also be known as or called a touch-sensitive display system. The device 100 may include a memory 102 (which may include one or more computer readable storage mediums), a memory controller 122, one or more processing units (CPU's) 120, a peripherals interface 118, RF circuitry 108, audio circuitry 110, a speaker 111, a microphone 113, an input/output (I/O) subsystem 106, other input or control devices 116, and an external port 124. The device 100 may include one or more optical sensors 164. These components may communicate over one or more communication buses or signal lines 103.

It should be appreciated that the device 100 is only one example of a portable multifunction device 100, and that the device 100 may have more or fewer components than shown, may combine two or more components, or a may have a different configuration or arrangement of the components. The various components shown in FIGS. 1A and 1B may be implemented in hardware, software or a combination of both hardware and software, including one or more signal processing and/or application specific integrated circuits.

Memory 102 may include high-speed random access memory and may also include non-volatile memory, such as one or more magnetic disk storage devices, flash memory devices, or other non-volatile solid-state memory devices. Access to memory 102 by other components of the device 100, such as the CPU 120 and the peripherals interface 118, may be controlled by the memory controller 122.

The peripherals interface 118 couples the input and output peripherals of the device to the CPU 120 and memory 102. The one or more processors 120 run or execute various software programs and/or sets of instructions stored in memory 102 to perform various functions for the device 100 and to process data.

In some embodiments, the peripherals interface 118, the CPU 120, and the memory controller 122 may be implemented on a single chip, such as a chip 104. In some other embodiments, they may be implemented on separate chips.

The RF (radio frequency) circuitry 108 receives and sends RF signals, also called electromagnetic signals. The RF circuitry 108 converts electrical signals to/from electromagnetic signals and communicates with communications networks and other communications devices via the electromagnetic signals. The RF circuitry 108 may include well-known circuitry for performing these functions, including but not limited to an antenna system, an RF transceiver, one or more amplifiers, a tuner, one or more oscillators, a digital signal processor, a CODEC chipset, a subscriber identity module (SIM) card, memory, and so forth. The RF circuitry 108 may communicate with networks, such as the Internet, also referred to as the World Wide Web (WWW), an intranet and/or a wireless network, such as a cellular telephone network, a wireless local area network (LAN) and/or a metropolitan area network (MAN), and other devices by wireless communication. The wireless communication may use any of a plurality of communications standards, protocols and technologies, including but not limited to Global System for Mobile Communications (GSM), Enhanced Data GSM Environment (EDGE), high-speed downlink packet access (HSDPA), wideband code division multiple access (W-CDMA), code division multiple access (CDMA), time division multiple access (TDMA), Bluetooth, Wireless Fidelity (Wi-Fi) (e.g., IEEE 802.11a, IEEE 802.11b, IEEE 802.11g and/or IEEE 802.11n), voice over Internet Protocol (VoIP), Wi-MAX, a protocol for email (e.g., Internet message access protocol (IMAP) and/or post office protocol (POP)), instant messaging (e.g., extensible messaging and presence protocol (XMPP), Session Initiation Protocol for Instant Messaging and Presence Leveraging Extensions (SIMPLE), and/or Instant Messaging and Presence Service (IMPS)), and/or Short Message Service (SMS)), or any other suitable communication protocol, including communication protocols not yet developed as of the filing date of this document.

The audio circuitry 110, the speaker 111, and the microphone 113 provide an audio interface between a user and the device 100. The audio circuitry 110 receives audio data from the peripherals interface 118, converts the audio data to an electrical signal, and transmits the electrical signal to the speaker 111. The speaker 111 converts the electrical signal to human-audible sound waves. The audio circuitry 110 also receives electrical signals converted by the microphone 113 from sound waves. The audio circuitry 110 converts the electrical signal to audio data and transmits the audio data to the peripherals interface 118 for processing. Audio data may be retrieved from and/or transmitted to memory 102 and/or the RF circuitry 108 by the peripherals interface 118. In some embodiments, the audio circuitry 110 also includes a headset jack (e.g. 212, FIG. 2). The headset jack provides an interface between the audio circuitry 110 and removable audio input/output peripherals, such as output-only headphones or a headset with both output (e.g., a headphone for one or both ears) and input (e.g., a microphone).

The I/O subsystem 106 couples input/output peripherals on the device 100, such as the touch screen 112 and other input/control devices 116, to the peripherals interface 118. The I/O subsystem 106 may include a display controller 156 and one or more input controllers 160 for other input or control devices. The one or more input controllers 160 receive/send electrical signals from/to other input or control devices 116. The other input/control devices 116 may include physical buttons (e.g., push buttons, rocker buttons, etc.), dials, slider switches, joysticks, click wheels, and so forth. In some alternate embodiments, input controller(s) 160 may be coupled to any (or none) of the following: a keyboard, infrared port, USB port, and a pointer device such as a mouse. The one or more buttons (e.g., 208, FIG. 2) may include an up/down button for volume control of the speaker 111 and/or the microphone 113. The one or more buttons may include a push button (e.g., 206, FIG. 2). A quick press of the push button may disengage a lock of the touch screen 112 or begin a process that uses gestures on the touch screen to unlock the device, as described in U.S. patent application Ser. No. 11/322,549, "Unlocking a Device by Performing Gestures on an Unlock Image," filed Dec. 23, 2005, which is hereby incorporated by reference in its entirety. A longer press of the push button (e.g., 206) may turn power to the device 100 on or off. The user may be able to customize a functionality of one or more of the buttons. The touch screen 112 is used to implement virtual or soft buttons and one or more soft keyboards.

The touch-sensitive touch screen 112 provides an input interface and an output interface between the device and a user. The display controller 156 receives and/or sends electrical signals from/to the touch screen 112. The touch screen 112 displays visual output to the user. The visual output may include graphics, text, icons, video, and any combination thereof (collectively termed "graphics"). In some embodiments, some or all of the visual output may correspond to user-interface objects, further details of which are described below.

A touch screen 112 has a touch-sensitive surface, sensor or set of sensors that accepts input from the user based on haptic and/or tactile contact. The touch screen 112 and the display controller 156 (along with any associated modules and/or sets of instructions in memory 102) detect contact (and any movement or breaking of the contact) on the touch screen 112 and converts the detected contact into interaction with user-interface objects (e.g., one or more soft keys, icons, web pages or images) that are displayed on the touch screen. In an exemplary embodiment, a point of contact between a touch screen 112 and the user corresponds to a finger of the user.

The touch screen 112 may use LCD (liquid crystal display) technology, or LPD (light emitting polymer display) technology, although other display technologies may be used in other embodiments. The touch screen 112 and the display controller 156 may detect contact and any movement or breaking thereof using any of a plurality of touch sensing technologies now known or later developed, including but not limited to capacitive, resistive, infrared, and surface acoustic wave technologies, as well as other proximity sensor arrays or other elements for determining one or more points of contact with a touch screen 112.

A touch-sensitive display in some embodiments of the touch screen 112 may be analogous to the multi-touch sensitive tablets described in the following U.S. Pat. Nos. 6,323, 846 (Westerman et al.), U.S. Pat. No. 6,570,557 (Westerman et al.), and/or U.S. Pat. No. 6,677,932 (Westerman), and/or U.S. Patent Publication 2002/0015024A1, each of which is hereby incorporated by reference in their entirety. However, a touch screen 112 displays visual output from the portable device 100, whereas touch sensitive tablets do not provide visual output.

A touch-sensitive display in some embodiments of the touch screen 112 may be as described in the following applications: (1) U.S. patent application Ser. No. 11/381,313, "Multipoint Touch Surface Controller," filed May 2, 2006; (2) U.S. patent application Ser. No. 10/840,862, "Multipoint Touchscreen," filed May 6, 2004; (3) U.S. patent application Ser. No. 10/903,964, "Gestures For Touch Sensitive Input Devices," filed Jul. 30, 2004; (4) U.S. patent application Ser. No. 11/048,264, "Gestures For Touch Sensitive Input Devices," filed Jan. 31, 2005; (5) U.S. patent application Ser. No. 11/038,590, "Mode-Based Graphical User Interfaces For Touch Sensitive Input Devices," filed Jan. 18, 2005; (6) U.S. patent application Ser. No. 11/228,758, "Virtual Input Device Placement On A Touch Screen User Interface," filed Sep. 16, 2005; (7) U.S. patent application Ser. No. 11/228,700, "Operation Of A Computer With A Touch Screen Interface," filed Sep. 16, 2005; (8) U.S. patent application Ser. No. 11/228,737, "Activating Virtual Keys Of A Touch-Screen Virtual Keyboard," filed Sep. 16, 2005; and (9) U.S. patent application Ser. No. 11/367,749, "Multi-Functional Hand-Held Device," filed Mar. 3, 2006. All of these applications are incorporated by reference herein in their entirety.

The touch screen 112 may have a resolution in excess of 100 dpi. In an exemplary embodiment, the touch screen has a resolution of approximately 160 dpi. The user may make contact with the touch screen 112 using any suitable object or appendage, such as a stylus, a finger, and so forth. In some embodiments, the user interface is designed to work primarily with finger-based contacts and gestures, which are much less precise than stylus-based input due to the larger area of contact of a finger on the touch screen. In some embodiments, the device translates the rough finger-based input into a precise pointer/cursor position or command for performing the actions desired by the user.

In some embodiments, in addition to the touch screen, the device 100 may include a touchpad (not shown) for activating or deactivating particular functions. In some embodiments, the touchpad is a touch-sensitive area of the device that, unlike the touch screen, does not display visual output. The touchpad may be a touch-sensitive surface that is separate from the touch screen 112 or an extension of the touch-sensitive surface formed by the touch screen.

In some embodiments, the device 100 may include a physical or virtual click wheel as an input control device 116. A user may navigate among and interact with one or more graphical objects (henceforth referred to as icons) displayed in the touch screen 112 by rotating the click wheel or by moving a point of contact with the click wheel (e.g., where the amount of movement of the point of contact is measured by its angular displacement with respect to a center point of the click wheel). The click wheel may also be used to select one or more of the displayed icons. For example, the user may press down on at least a portion of the click wheel or an associated button. User commands and navigation commands provided by the user via the click wheel may be processed by an input controller 160 as well as one or more of the modules and/or sets of instructions in memory 102. For a virtual click wheel, the click wheel and click wheel controller may be part of the touch screen 112 and the display controller 156, respectively. For a virtual click wheel, the click wheel may be either an opaque or semitransparent object that appears and disappears on the touch screen display in response to user interaction with the device. In some embodiments, a virtual click wheel is displayed on the touch screen of a portable multifunction device and operated by user contact with the touch screen.

The device 100 also includes a power system 162 for powering the various components. The power system 162 may include a power management system, one or more power sources (e.g., battery, alternating current (AC)), a recharging system, a power failure detection circuit, a power converter or inverter, a power status indicator (e.g., a light-emitting diode (LED)) and any other components associated with the generation, management and distribution of power in portable devices.

The device 100 may also include one or more optical sensors 164. FIGS. 1A and 1B show an optical sensor coupled to an optical sensor controller 158 in I/O subsystem 106. The optical sensor 164 may include charge-coupled device (CCD) or complementary metal-oxide semiconductor (CMOS) phototransistors. The optical sensor 164 receives light from the environment, projected through one or more lens, and converts the light to data representing an image. In conjunction with an imaging module 143 (also called a camera module), the optical sensor 164 may capture still images or video. In some embodiments, an optical sensor is located on the back of the device 100, opposite the touch screen display 112 on the front of the device, so that the touch screen display may be used as a viewfinder for either still and/or video image acquisition. In some embodiments, an optical sensor is located on the front of the device so that the user's image may be obtained for videoconferencing while the user views the other video conference participants on the touch screen display. In some embodiments, the position of the optical sensor 164 can be changed by the user (e.g., by rotating the lens and the sensor in the device housing) so that a single optical sensor 164 may be used along with the touch screen display for both video conferencing and still and/or video image acquisition.

The device 100 may also include one or more proximity sensors 166. FIGS. 1A and 1B show a proximity sensor 166 coupled to the peripherals interface 118. Alternately, the proximity sensor 166 may be coupled to an input controller 160 in the I/O subsystem 106. The proximity sensor 166 may perform as described in U.S. patent application Ser. No. 11/241,839, "Proximity Detector In Handheld Device," Sep. 30, 2005; Ser. No. 11/240,788, "Proximity Detector In Handheld Device," Sep. 30, 2005; Ser. No. 11/620,702, "Using Ambient Light Sensor To Augment Proximity Sensor Output"; Ser. No. 11/586,862, "Automated Response To And Sensing Of User Activity In Portable Devices," filed Oct. 24, 2006; and Ser. No. 11/638,251, "Methods And Systems For Automatic Configuration Of Peripherals," which are hereby incorporated by reference in their entirety. In some embodiments, the proximity sensor turns off and disables the touch screen 112 when the multifunction device is placed near the user's ear (e.g., when the user is making a phone call). In some embodiments, the proximity sensor keeps the screen off when the device is in the user's pocket, purse, or other dark area to prevent unnecessary battery drainage when the device is a locked state.

The device 100 may also include one or more accelerometers 168. FIGS. 1A and 1B show an accelerometer 168 coupled to the peripherals interface 118. Alternately, the accelerometer 168 may be coupled to an input controller 160 in the I/O subsystem 106. The accelerometer 168 may perform as described in U.S. Patent Publication No. 20050190059, "Acceleration-based Theft Detection System for Portable Electronic Devices," and U.S. Patent Publication No. 20060017692, "Methods And Apparatuses For Operating A Portable Device Based On An Accelerometer," both of which are which are incorporated by reference in their entirety. In some embodiments, information is displayed on the touch screen display in a portrait view or a landscape view based on an analysis of data received from the one or more accelerometers.

In some embodiments, the software components stored in memory 102 may include an operating system 126, a communication module (or set of instructions) 128, a contact/motion module (or set of instructions) 130, a graphics module (or set of instructions) 132, a text input module (or set of instructions) 134, a Global Positioning System (GPS) module (or set of instructions) 135, and applications (or set of instructions) 136.

The operating system 126 (e.g., Darwin, RTXC, LINUX, UNIX, OS X, WINDOWS, or an embedded operating system such as VxWorks) includes various software components and/or drivers for controlling and managing general system tasks (e.g., memory management, storage device control, power management, etc.) and facilitates communication between various hardware and software components.

The communication module 128 facilitates communication with other devices over one or more external ports 124 and also includes various software components for handling data received by the RF circuitry 108 and/or the external port 124. The external port 124 (e.g., Universal Serial Bus (USB), FIREWIRE, etc.) is adapted for coupling directly to other devices or indirectly over a network (e.g., the Internet, wireless LAN, etc.). In some embodiments, the external port is a multi-pin (e.g., 30-pin) connector that is the same as, or similar to and/or compatible with the 30-pin connector used on iPod (trademark of Apple Computer, Inc.) devices.

The contact/motion module 130 may detect contact with the touch screen 112 (in conjunction with the display controller 156) and other touch sensitive devices (e.g., a touchpad or physical click wheel). The contact/motion module 130 includes various software components for performing various operations related to detection of contact, such as determining if contact has occurred, determining if there is movement of the contact and tracking the movement across the touch screen 112, and determining if the contact has been broken (i.e., if the contact has ceased). Determining movement of the point of contact may include determining speed (magnitude), velocity (magnitude and direction), and/or an acceleration (a change in magnitude and/or direction) of the point of contact. These operations may be applied to single contacts (e.g., one finger contacts) or to multiple simultaneous contacts (e.g., "multitouch"/multiple finger contacts). In some embodiments, the contact/motion module 130 and the display controller 156 also detects contact on a touchpad. In some embodiments, the contact/motion module 130 and the controller 160 detects contact on a click wheel.

The graphics module 132 includes various known software components for rendering and displaying graphics on the touch screen 112, including components for changing the intensity of graphics that are displayed. As used herein, the term "graphics" includes any object that can be displayed to a user, including without limitation text, web pages, icons (such as user-interface objects including soft keys), digital images, videos, animations and the like.

The text input module 134, which may be a component of graphics module 132, provides soft keyboards for entering text in various applications (e.g., contacts 137, e-mail 140, IM 141, blogging 142, browser 147, and any other application that needs text input).

The GPS module 135 determines the location of the device and provides this information for use in various applications (e.g., to telephone 138 for use in location-based dialing, to camera 143 and/or blogger 142 as picture/video metadata, and to applications that provide location-based services such as weather widgets, local yellow page widgets, and map/navigation widgets).

The applications 136 may include the following modules (or sets of instructions), or a subset or superset thereof:

- a contacts module 137 (sometimes called an address book or contact list);
- a telephone module 138;
- a video conferencing module 139;
- an e-mail client module 140;
- an instant messaging (IM) module 141;
- a blogging module 142;
- a camera module 143 for still and/or video images;
- an image management module 144;
- a video player module 145;
- a music player module 146;
- a browser module 147;
- a calendar module 148;
- widget modules 149, which may include weather widget 149-1, stocks widget 149-2, calculator widget 149-3, alarm clock widget 149-4, dictionary widget 149-5, and other widgets obtained by the user, as well as user-created widgets 149-6;
- widget creator module 150 for making user-created widgets 149-6;
- search module 151;
- video and music player module 152, which merges video player module 145 and music player module 146;
- notes module 153;
- map module 154; and/or
- online video module 155.

Examples of other applications 136 that may be stored in memory 102 include other word processing applications, JAVA-enabled applications, encryption, digital rights management, voice recognition, and voice replication.

In conjunction with touch screen 112, display controller 156, contact module 130, graphics module 132, and text input module 134, the contacts module 137 may be used to manage an address book or contact list, including: adding name(s) to the address book; deleting name(s) from the address book; associating telephone number(s), e-mail address(es), physical address(es) or other information with a name; associating an image with a name; categorizing and sorting names; providing telephone numbers or e-mail addresses to initiate and/or facilitate communications by telephone 138, video conference 139, e-mail 140, or IM 141; and so forth.

In conjunction with RF circuitry 108, audio circuitry 110, speaker 111, microphone 113, touch screen 112, display controller 156, contact module 130, graphics module 132, and text input module 134, the telephone module 138 may be used to enter a sequence of characters corresponding to a telephone number, access one or more telephone numbers in the address book 137, modify a telephone number that has been entered, dial a respective telephone number, conduct a conversation and disconnect or hang up when the conversation is completed. As noted above, the wireless communication may use any of a plurality of communications standards, protocols and technologies.

In conjunction with RF circuitry 108, audio circuitry 110, speaker 111, microphone 113, touch screen 112, display controller 156, optical sensor 164, optical sensor controller 158, contact module 130, graphics module 132, text input module 134, contact list 137, and telephone module 138, the videoconferencing module 139 may be used to initiate, conduct, and terminate a video conference between a user and one or more other participants.

In conjunction with RF circuitry 108, touch screen 112, display controller 156, contact module 130, graphics module 132, and text input module 134, the e-mail client module 140 may be used to create, send, receive, and manage e-mail. In conjunction with image management module 144, the e-mail module 140 makes it very easy to create and send e-mails with still or video images taken with camera module 143.

In conjunction with RF circuitry 108, touch screen 112, display controller 156, contact module 130, graphics module 132, and text input module 134, the instant messaging module 141 may be used to enter a sequence of characters corresponding to an instant message, to modify previously entered characters, to transmit a respective instant message (for example, using a Short Message Service (SMS) or Multimedia Message Service (MMS) protocol for telephony-based instant messages or using XMPP, SIMPLE, or IMPS for Internet-based instant messages), to receive instant messages and to view received instant messages. In some embodiments, transmitted and/or received instant messages may include graphics, photos, audio files, video files and/or other attachments as are supported in a MMS and/or an Enhanced Messaging Service (EMS). As used herein, "instant messaging" refers to both telephony-based messages (e.g., messages sent using SMS or MMS) and Internet-based messages (e.g., messages sent using XMPP, SIMPLE, or IMPS).

In conjunction with RF circuitry 108, touch screen 112, display controller 156, contact module 130, graphics module 132, text input module 134, image management module 144, and browsing module 147, the blogging module 142 may be used to send text, still images, video, and/or other graphics to a blog (e.g., the user's blog).

In conjunction with touch screen 112, display controller 156, optical sensor(s) 164, optical sensor controller 158, contact module 130, graphics module 132, and image management module 144, the camera module 143 may be used to capture still images or video (including a video stream) and store them into memory 102, modify characteristics of a still image or video, or delete a still image or video from memory 102.

In conjunction with touch screen 112, display controller 156, contact module 130, graphics module 132, text input module 134, and camera module 143, the image management module 144 may be used to arrange, modify or otherwise manipulate, label, delete, present (e.g., in a digital slide show or album), and store still and/or video images.

In conjunction with touch screen 112, display controller 156, contact module 130, graphics module 132, audio circuitry 110, and speaker 111, the video player module 145 may be used to display, present or otherwise play back videos (e.g., on the touch screen or on an external, connected display via external port 124).

In conjunction with touch screen 112, display system controller 156, contact module 130, graphics module 132, audio circuitry 110, speaker 111, RF circuitry 108, and browser module 147, the music player module 146 allows the user to download and play back recorded music and other sound files stored in one or more file formats, such as MP3 or AAC files. In some embodiments, the device 100 may include the functionality of an MP3 player, such as an iPod (trademark of Apple Computer, Inc.).

In conjunction with RF circuitry 108, touch screen 112, display system controller 156, contact module 130, graphics module 132, and text input module 134, the browser module 147 may be used to browse the Internet, including searching, linking to, receiving, and displaying web pages or portions thereof, as well as attachments and other files linked to web pages.

In conjunction with RF circuitry 108, touch screen 112, display system controller 156, contact module 130, graphics module 132, text input module 134, e-mail module 140, and browser module 147, the calendar module 148 may be used to create, display, modify, and store calendars and data associated with calendars (e.g., calendar entries, to do lists, etc.).

In conjunction with RF circuitry 108, touch screen 112, display system controller 156, contact module 130, graphics module 132, text input module 134, and browser module 147, the widget modules 149 are mini-applications that may be downloaded and used by a user (e.g., weather widget 149-1, stocks widget 149-2, calculator widget 149-3, alarm clock widget 149-4, and dictionary widget 149-5) or created by the user (e.g., user-created widget 149-6). In some embodiments, a widget includes an HTML (Hypertext Markup Language) file, a CSS (Cascading Style Sheets) file, and a JavaScript file. In some embodiments, a widget includes an XML (Extensible Markup Language) file and a JavaScript file (e.g., Yahoo! Widgets).

In conjunction with RF circuitry 108, touch screen 112, display system controller 156, contact module 130, graphics module 132, text input module 134, and browser module 147, the widget creator module 150 may be used by a user to create widgets (e.g., turning a user-specified portion of a web page into a widget).

In conjunction with touch screen 112, display system controller 156, contact module 130, graphics module 132, and text input module 134, the search module 151 may be used to search for text, music, sound, image, video, and/or other files in memory 102 that match one or more search criteria (e.g., one or more user-specified search terms).

In conjunction with touch screen 112, display controller 156, contact module 130, graphics module 132, and text input module 134, the notes module 153 may be used to create and manage notes, to do lists, and the like.

In conjunction with RF circuitry 108, touch screen 112, display system controller 156, contact module 130, graphics module 132, text input module 134, GPS module 135, and browser module 147, the map module 154 may be used to receive, display, modify, and store maps and data associated with maps (e.g., driving directions; data on stores and other points of interest at or near a particular location; and other location-based data).

In conjunction with touch screen 112, display system controller 156, contact module 130, graphics module 132, audio circuitry 110, speaker 111, RF circuitry 108, text input module 134, e-mail client module 140, and browser module 147, the online video module 155 allows the user to access, browse, receive (e.g., by streaming and/or download), play back (e.g., on the touch screen or on an external, connected display via external port 124), send an e-mail with a link to a particular online video, and otherwise manage online videos in one or more file formats, such as H.264. In some embodiments, instant messaging module 141, rather than e-mail client module 140, is used to send a link to a particular online video. Embodiments of user interfaces and associated processes using online video module 155 are described further below.

Each of the above identified modules and applications correspond to a set of instructions for performing one or more functions described above. These modules (i.e., sets of instructions) need not be implemented as separate software programs, procedures or modules, and thus various subsets of these modules may be combined or otherwise re-arranged in various embodiments. For example, video player module 145 may be combined with music player module 146 into a single module (e.g., video and music player module 152, FIG. 1B). In some embodiments, memory 102 may store a subset of the modules and data structures identified above. Furthermore, memory 102 may store additional modules and data structures not described above.

In some embodiments, the device 100 is a device where operation of a predefined set of functions on the device is performed exclusively through a touch screen 112 and/or a touchpad. By using a touch screen and/or a touchpad as the primary input/control device for operation of the device 100, the number of physical input/control devices (such as push buttons, dials, and the like) on the device 100 may be reduced.

The predefined set of functions that may be performed exclusively through a touch screen and/or a touchpad include navigation between user interfaces. In some embodiments, the touchpad, when touched by the user, navigates the device 100 to a main, home, or root menu from any user interface that may be displayed on the device 100. In such embodiments, the touchpad may be referred to as a "menu button." In some other embodiments, the menu button may be a physical push button or other physical input/control device instead of a touchpad.

Figure 5A:
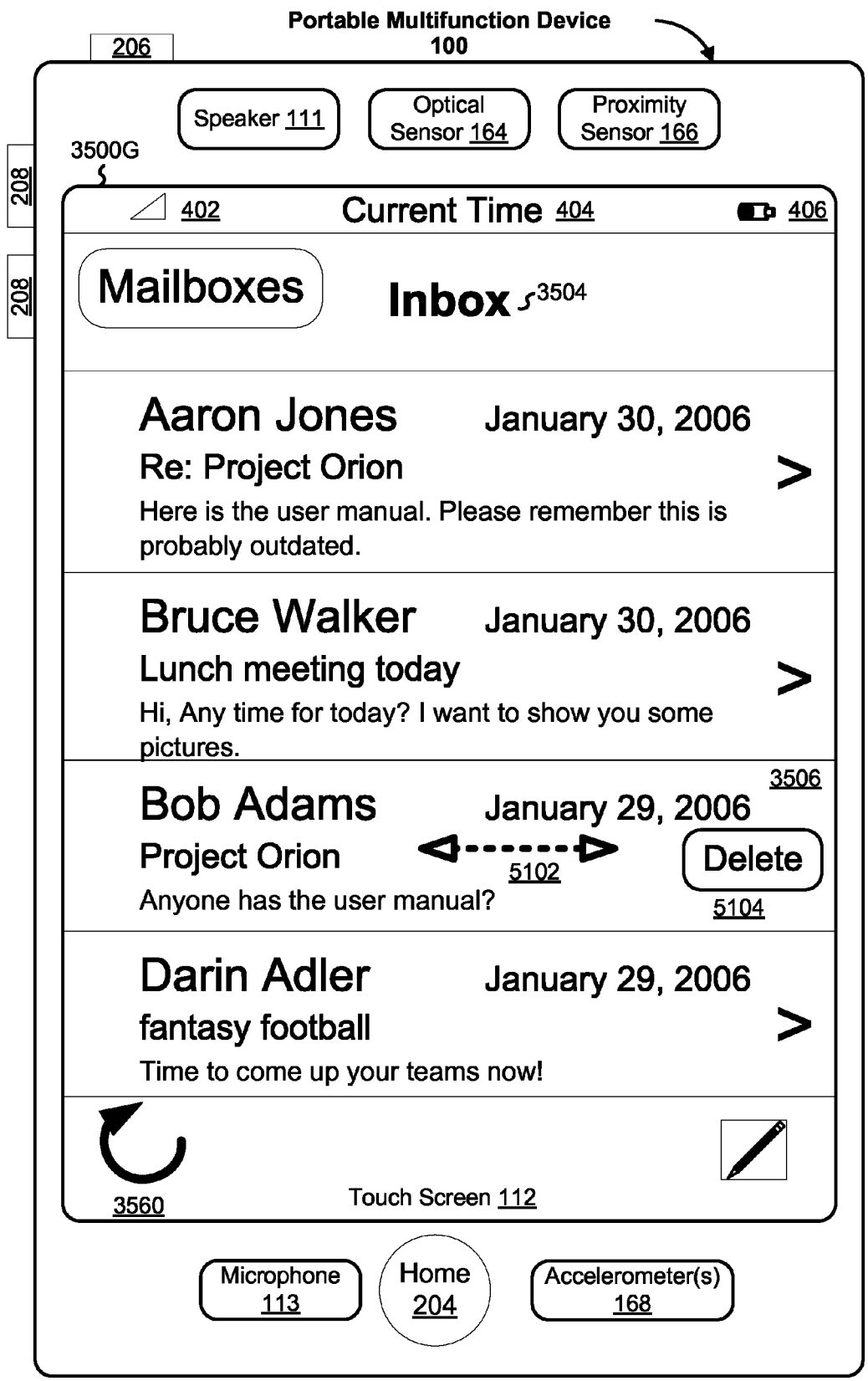
FIGS. 5A-5B illustrate an exemplary user interface for an email client for a portable electronic device in accordance with some embodiments.

FIGS. 1C and 1D are block diagrams illustrating additional details of the email client module 140 in accordance with some embodiments. The email client module 140 includes email client code 172 and email client data 180. The email client code 172 includes an email front end 173 that provides user-level email functionality, manages the user interface of the email module 140 and enables a user to interact with an email inbox 3504, among other functions (FIG. 5A). The email client code 140 also includes autofetch functionality 174, which, when enabled, manages the fetching of email from an email server to the portable device 100. In some embodiments, the autofetch functionality 174 is configured to fetch email such that: (1) fresh email is available to the user when he/she expects it, and (2) battery power consumption due to communications with an email server and usage of CPU resources for email fetching is optimized (i.e., reduced to the extent possible given user expectations). In some embodiments, the autofetch functionality 174 is operable regardless of whether the email module 140 is active (running in the foreground, in an open window) or inactive (running in the background, or in a minimized window). The autofetch functionality 174 can also be configured to be operable only when the email module 140 is active, it can be disabled completely such that email is only fetched in response to user requests, or it can operate in other modes. While the autofetch functionality 174 is described herein with reference to a single user account, it can easily be extended to multiple user accounts on a single portable device 100. This can be enabled, for example, by providing independent autofetch settings 181 for each user account.

The email client code 172 also includes port discovery functionality 175 that implements a process by which connections to an email server 199 (FIG. 1E) are discovered for the portable device 100 for a user email account 191. Email server 199 is sometimes herein called an "outbound email server," which forwards email messages received from clients to the email accounts or addresses specified in those email messages. In one embodiment, the port discovery functionality 175 automatically discovers for a particular configuration of portable device 100, network 198 (FIG. 1E) and email server 199 (FIG. 1E) the most secure connection configuration (port and security setting) available for email communications. In one possible use, this information is determined for a new user email account and then stored as a preferred network configuration for the device 100. The port discovery functionality 175 also manages email connections during subsequent email communications. For example, if the portable device 100 cannot connect to the outbound email server 199 using the stored configuration 185, the port discovery functionality 175 is configured to determine a fallback network configuration. In some embodiments, the fallback configuration is selected to be the most secure connection configuration available at the time. While the port discovery functionality 175 is described herein with reference to a single user account, email server and associated network configuration, it can easily be extended to multiple user accounts, servers and network configurations accessible from a single portable device 100. This can be enabled, for example, by providing independent port/security settings 184 for each user account, email server and network configuration.

The email client data 180 includes autofetch settings 181 used by the autofetch functionality 174, port/security settings used by port discovery functionality 175, and email account information 191 managed by the email front end 173. In the embodiment shown in FIG. 1C, the autofetch settings 181 include stored values for first, second, third and fourth time periods 182-1, 182-2, 182-3, 182-4. These time periods determine when the autofetch functionality 174 should fetch email in response to respective events and/or the current state of the email module 140. In one example, the periods 182-i are defined as follows:

| | |
|---|---|
| First Period 182-1 | After the email module is launched or resumed - the time period since such launch event after which an autofetch is to be performed. |
| Second Period 182-2 | While the email module is running in the foreground - the time period since the prior fetch after which an autofetch is to be performed. |
| Third Period 182-3 | While the email module is running in the background - the time period since the prior fetch after which an autofetch is to be performed. |
| Fourth Period 182-4 | After the portable device 100 is unlocked, the time period since such unlock event after when an autofetch is to be performed. |

The values stored for each period 182 can be predefined or user-definable, depending on the embodiment. For example, in an embodiment described below, the first, second and fourth periods are predefined with a single respective value (one minute, five minutes and one minute, respectively) and the third period is user selectable from a collection of predefined values. When there are predefined values, they are stored in the predefined values data item 182-5. FIG. 1C shows an example of a collection of predefined values 182-5 from which a user can select a value for the third period 182-3. These values 182-5 include 15 minutes, 30 minutes, 60 minutes and "never" (meaning that the user does not want email to be fetched while the email module is running in the background.). Different embodiments can also employ different numbers of time periods 182-*i* depending on the email module states and/or user events that are to be accommodated by the autofetch functionality 174.

The autofetch settings 181 also include an autofetch flag 183 that can be set to YES (autofetch enabled) or NO (autofetch disabled). Email can be fetched when autofetch is disabled, but in many configurations this would only be done upon user request or, alternatively, upon the occurrence of predefined events, such as launching the email module 140 or sending an outbound email message.

The port/security settings 184 include information that is used by the port discovery functionality 175 to identify a preferred default communication configuration and to determine a fallback setting when the preferred setting is not operable. The stored configuration 185 contains the port number 186 and security level 187 of the preferred network configuration discovered by the port discovery functionality 175. Consistent with standard practice, for an outbound SMTP email server the range of possible port numbers, from most to least preferred, include: "587," "25" and "465." Also consistent with standard practice, the security levels that can be supported by an SMTP email server include, from strongest to weakest: "SSL" (secured socket layer), "STARTTLS," and unsecured ("no SSL or STARTTLS"). The combination of a port number and a security level/protocol is referred to herein as a "configuration." The sequences 188, 190 used to determine a preferred and a fallback configuration are now described.

Referring to FIG. 1C, the validation sequence 188 is a stored sequence of port/security combinations for an SMTP email server arranged, in one embodiment, from strongest (i.e., most secure) to least secure. For example, the port/security combination designated "587/SSL" is the strongest combination and, therefore, the preferred channel configuration for SMTP email in the illustrated embodiment. As described with reference to FIGS. 6A and 6B, in one method the port discovery functionality 175 steps through the validation sequence to determine the strongest network configuration that can be used for email communications with the outbound email server 199. One possible validation sequence 188 is shown in FIG. 1C. The sequence in this example reflects one possible order of preferred connections for an SMTP email server. For example, given this validation sequence, the port discovery functionality 175 would try to connect to the email server 199 using different network configurations in the following sequence (stopping when successful):

| | |
|---|---|
| 1. | 587/SSL, |
| 2. | 587/STARTTLS, |
| 3. | 25/SSL, |
| 4. | 25/STARTTLS, |
| 5. | 465/SSL, |
| 6. | 465/STARTTLS, |
| 7. | 587/no SSL or STARTTLS, |
| 8. | 25/no SSL or STARTTLS, |
| 9. | 465/no SSL or STARTTLS. |

The fallback sequence 190 is a stored sequence of port/security combinations for an SMTP server arranged, in some situations, differently from the validation sequence 188. In one embodiment, this is because the fallback sequence 190 is configured such that, starting from the entry that matches the stored configuration 185, the available fallback configurations represent a lesser but still acceptable level of email security. An example of a fallback sequence 190 is shown in FIG. 1C. In this example, note that the top three entries are unsecured configurations (indicated by their security level being defined as "NO SSL OR STARTTLS"). Because these are at the top of the fallback sequence 190, the port discovery functionality 175 will not "fall back" to these values when the stored configuration 185 has any of the higher levels of security. For example, even if the stored configuration 185 had the lowest level with some level of security (e.g., "465/STARTTLS"), the port discovery functionality 175 would not "fall back" to an unsecured channel configuration since those configurations are at the top of the fallback sequence and thus not available as fallbacks in this instance. As another example, if the stored configuration 185 is "25/STARTTLS", the port discovery functionality 175 would test entries in the fallback sequence 190 in the following order (stopping when successful):

| | |
|---|---|
| 1. | 465/SSL, |
| 2. | 465/STARTTLS. |

The fallback sequence 190 described with respect to FIG. 1C is configured so it can be used with any of the port/security combinations shown in the exemplary validation sequence 188 shown in FIG. 1C. In a different embodiment described with reference to FIG. 1D, an alternative fallback collection 192 can be defined that includes multiple fallback sequences 194-*i* each corresponding to a respective one (or more) of the possible stored configurations 185. Thus, given the possible channel configurations shown in FIG. 1C, there can be as many as nine different fallback sequences 194-1 to 194-9, each associated with one or more of the port/security combinations in the validation sequence 188. For example, in FIG. 1D, a fallback sequence 194-7 is shown that corresponds to the seventh entry in the validation sequence 188 ("25/STARTTLS"). The shaded entries of the fallback sequence 194-7 show which settings would be tried by the port discovery functionality 175 if connection cannot be made with the "25/STARTTLS" configuration. In this alternative arrangement, the fallback sequences 194-*i* can be tuned for the different types of network configurations. An overview of operation of the port discovery functionality 175 in the context of a network environment is now described with reference to FIG. 1E.

Figure 1E:
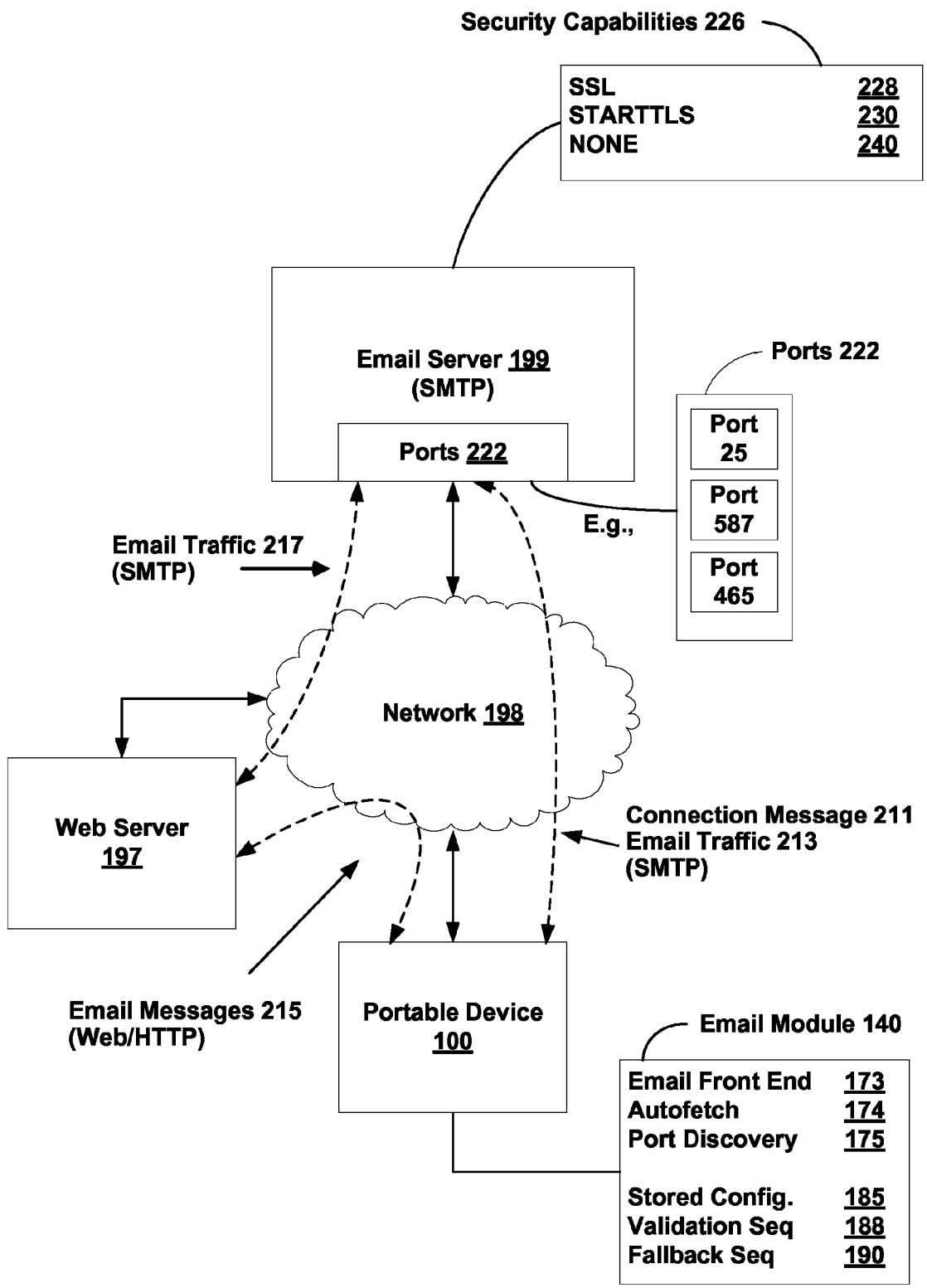
FIG. 1E is a system diagram illustrating a network in which a portable electronic device with email capabilities is operable in accordance with some embodiments.

FIG. 1E is a system diagram that illustrates a network environment in which a portable electronic device with email capabilities is operable in accordance with some embodiments. The network environment includes a portable electronic device 100 configured in accordance with the present invention, a web server 197, a network 198, and an outbound email server 199. As described with reference to FIG. 1C, the portable device includes an email module 140 with an email front end 173 and autofetch and port discovery functionality 174, 175. The email module 140 also includes a stored network configuration 185 and validation and fallback sequences 188, 190 as described above. The portable device 100 is configured in some embodiments to communicate with the outbound email server 199 directly, using an SMTP connection, or indirectly, via the web server 197. When the device 100 uses its web connection to send email, it sends email messages 215 to the web server 197 using an HTTP connection and the web server exchanges email traffic 217 with the outbound email server 199 using an SMTP connection. The portable device 100 tests possible network connections to the outbound SMTP server 199 using connection messages 211, wherein it attempts to connect to a particular port 222 and confirm the availability at the server 199 of a particular level of security 226. The manner of testing a respective connection to an SMTP server using such messages is well known.

In some embodiments, the outbound email server 199 is an SMTP email server that is responsible for delivering email transferred to it. As shown, the portable device 100 can request email delivery from the server 199 directly (via email traffic 213) or indirectly, via the web server 197 (via email traffic 217). The SMTP server 199 can support one or more security capabilities 226, such as SSL 228 (the strongest) and STARTTLS 230. If a particular SMTP server does not provide any security, this is represented by a security capability 226 of None 240. The outbound email server provides a range of ports 222 (sometimes called standard ports) to which an email client (such as the portable device 100) connects for email services. The ports 222 include port 25, port 587 and port 465.

Figure 2:
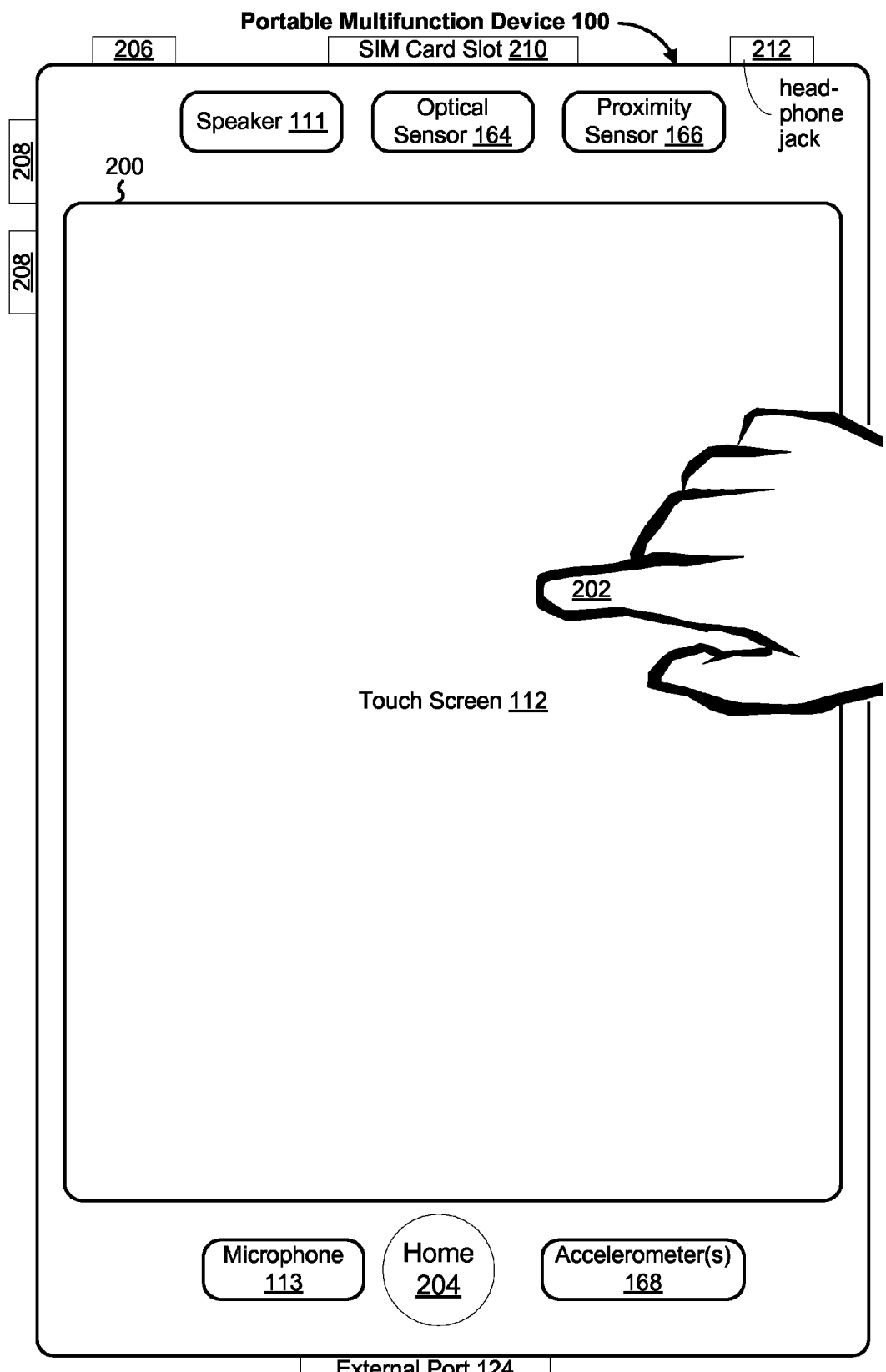
FIG. 2 illustrates a portable multifunction device having a touch screen in accordance with some embodiments.

FIG. 2 illustrates a portable multifunction device 100 having a touch screen 112 in accordance with some embodiments. The touch screen may display one or more graphics within user interface (UI) 200. In this embodiment, as well as others described below, a user may select one or more of the graphics by making contact or touching the graphics, for example, with one or more fingers 202 (not drawn to scale in the figure). In some embodiments, selection of one or more graphics occurs when the user breaks contact with the one or more graphics. In some embodiments, the contact may include a gesture, such as one or more taps, one or more swipes (from left to right, right to left, upward and/or downward) and/or a rolling of a finger (from right to left, left to right, upward and/or downward) that has made contact with the device 100. In some embodiments, inadvertent contact with a graphic may not select the graphic. For example, a swipe gesture that sweeps over an application icon may not select the corresponding application when the gesture corresponding to selection is a tap.

The device 100 may also include one or more physical buttons, such as "home" or menu button 204. As described previously, the menu button 204 may be used to navigate to any application 136 in a set of applications that may be executed on the device 100. Alternatively, in some embodiments, the menu button is implemented as a soft key in a GUI in touch screen 112.

In one embodiment, the device 100 includes a touch screen 112, a menu button 204, a push button 206 for powering the device on/off and locking the device, volume adjustment button(s) 208, a Subscriber Identity Module (SIM) card slot 210, a head set jack 212, and a docking/charging external port 124. The push button 206 may be used to turn the power on/off on the device by depressing the button and holding the button in the depressed state for a predefined time interval; to lock the device by depressing the button and releasing the button before the predefined time interval has elapsed; and/or to unlock the device or initiate an unlock process. In an alternative embodiment, the device 100 also may accept verbal input for activation or deactivation of some functions through the microphone 113.

Attention is now directed towards embodiments of user interfaces ("UI") and associated processes that may be implemented on a portable multifunction device 100.

Figure 3:
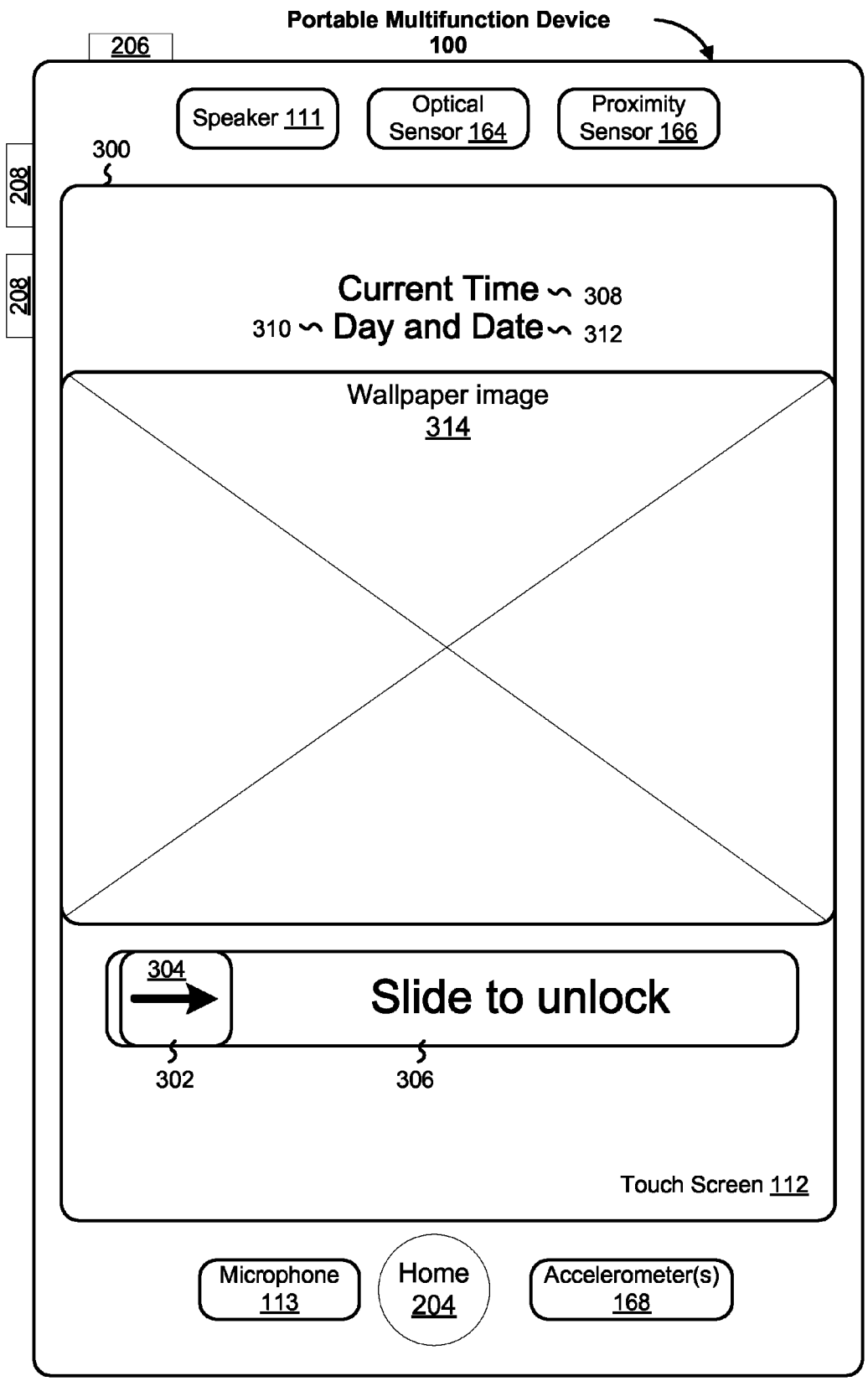
FIG. 3 illustrates an exemplary user interface for unlocking a portable electronic device in accordance with some embodiments.

FIG. 3 illustrates an exemplary user interface for unlocking a portable electronic device in accordance with some embodiments. In some embodiments, user interface 300 includes the following elements, or a subset or superset thereof:

Unlock image 302 that is moved with a finger gesture to unlock the device;
Arrow 304 that provides a visual cue to the unlock gesture;
Channel 306 that provides additional cues to the unlock gesture;
Time 308;
Day 310;
Date 312; and
Wallpaper image 314.

In some embodiments, the device detects contact with the touch-sensitive display (e.g., a user's finger making contact on or near the unlock image 302) while the device is in a user-interface lock state. The device moves the unlock image 302 in accordance with the contact. The device transitions to a user-interface unlock state if the detected contact corresponds to a predefined gesture, such as moving the unlock image across channel 306. Conversely, the device maintains the user-interface lock state if the detected contact does not correspond to the predefined gesture. As noted above, processes that use gestures on the touch screen to unlock the device are described in U.S. patent application Ser. Nos. 11/322,549, "Unlocking A Device By Performing Gestures On An Unlock Image," filed Dec. 23, 2005, and Ser. No. 11/322,550, "Indication Of Progress Towards Satisfaction Of A User Input Condition," filed Dec. 23, 2005, which are hereby incorporated by reference in their entirety.

Figure 4A:
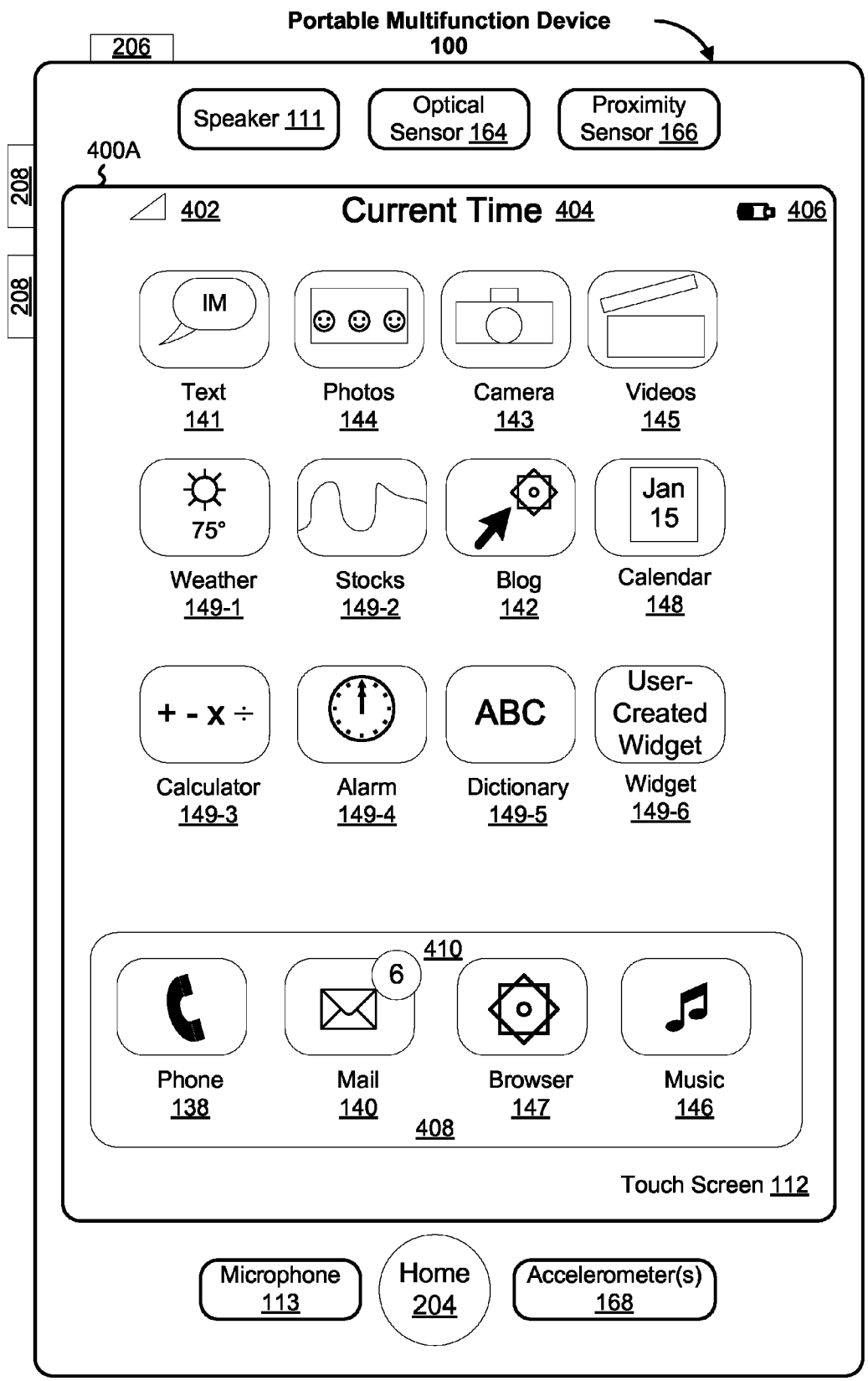
FIGS. 4A and 4B illustrate exemplary user interfaces for a menu of applications on a portable multifunction device in accordance with some embodiments.
Figure 4B:
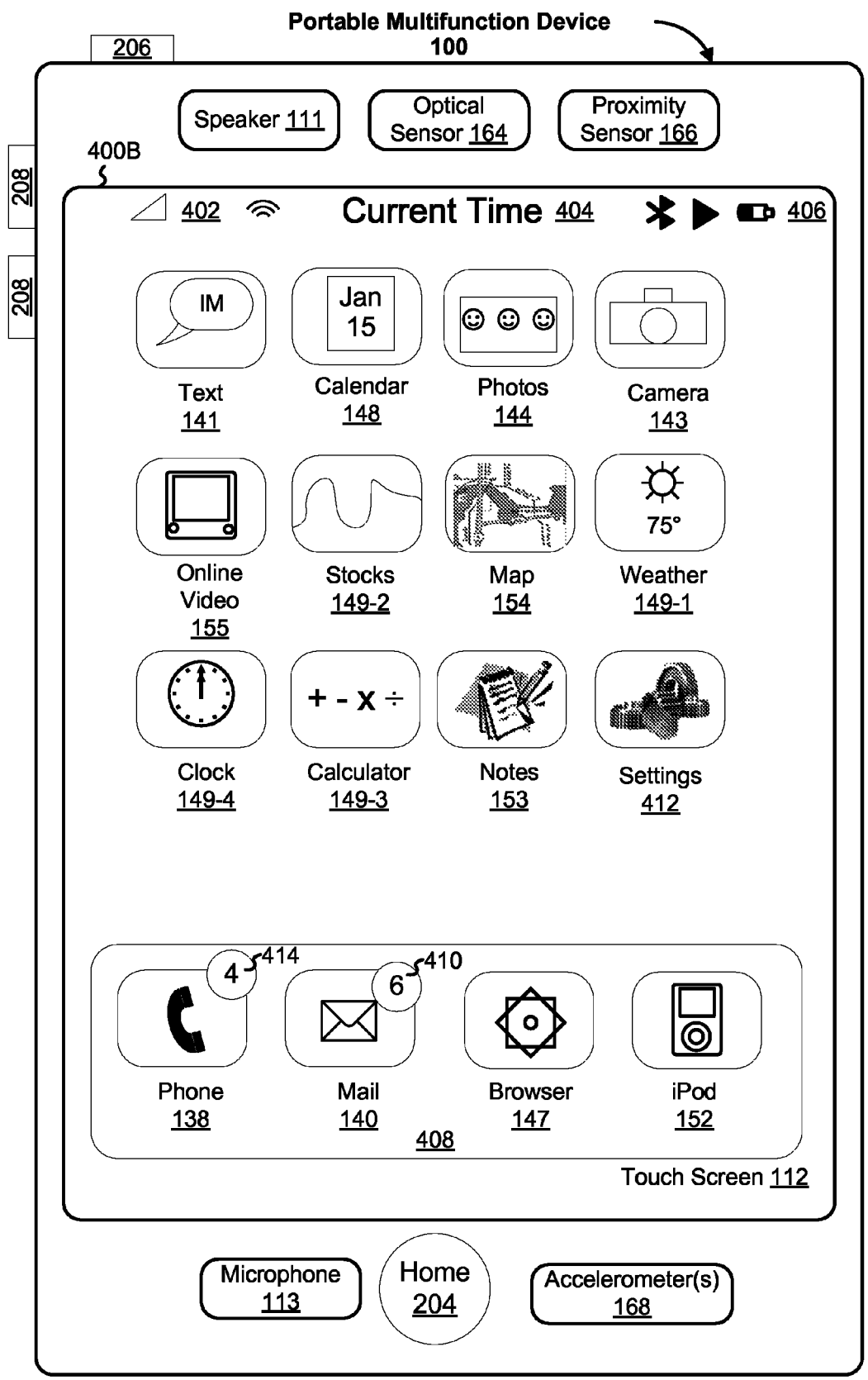

FIGS. 4A and 4B illustrate exemplary user interfaces for a menu of applications on a portable multifunction device in accordance with some embodiments. In some embodiments, user interface 400A includes the following elements, or a subset or superset thereof:

Signal strength indicator(s) 402 for wireless communication(s), such as cellular and Wi-Fi signals;
Time 404;
Battery status indicator 406;
Tray 408 with icons for frequently used applications, such as one or more of the following:
  Phone 138, which may include an indicator 414 (FIG. 4B) of the number of missed calls or voicemail messages;
  E-mail client 140, which may include an indicator 410 of the number of unread e-mails;
  Browser 147; and
  Music player 146; and
Icons for other applications, such as one or more of the following:
  IM 141;
  Image management 144;
  Camera 143;
  Video player 145;
  Weather 149-1;
  Stocks 149-2;
  Blog 142;
  Calendar 148;
  Calculator 149-3;
  Alarm clock 149-4;
  Dictionary 149-5; and
  User-created widget 149-6.

In some embodiments, user interface 400B includes the following elements, or a subset or superset thereof:
402, 404, 406, 141, 148, 144, 143, 149-3, 149-2, 149-1, 149-4, 410, 414, 138, 140, and 147, as described above;
Map 154;
Notes 153;
Settings 412, which provides access to settings for the device 100 and its various applications 136, as described further below;
Video and music player module 152, also referred to as iPod 152 (trademark of Apple Computer, Inc.); and Online video module 155, also referred to as YouTube (trademark of Google, Inc.).

In some embodiments, UI 400A or 400B displays all of the available applications 136 on one screen so that there is no need to scroll through a list of applications (e.g., via a scroll bar). In some embodiments, as the number of applications increase, the icons corresponding to the applications may decrease in size so that all applications may be displayed on a single screen without scrolling. In some embodiments, having all applications on one screen and a menu button enables a user to access any desired application with at most two inputs, such as activating the menu button 204 and then activating the desired application (e.g., by a tap or other finger gesture on the icon corresponding to the application).

In some embodiments, UI 400A or 400B provides integrated access to both widget-based applications and non-widget-based applications. In some embodiments, all of the widgets, whether user-created or not, are displayed in UI 400A or 400B. In other embodiments, activating the icon for user-created widget 149-6 may lead to another UT that contains the user-created widgets or icons corresponding to the user-created widgets.

In some embodiments, a user may rearrange the icons in UI 400A or 400B, e.g., using processes described in U.S. patent application Ser. No. 11/459,602, "Portable Electronic Device With Interface Reconfiguration Mode," filed Jul. 24, 2006, which is hereby incorporated by reference in its entirety. For example, a user may move application icons in and out of tray 408 using finger gestures.

In some embodiments, UI 400A or 400B includes a gauge (not shown) that displays an updated account usage metric for an account associated with usage of the device (e.g., a cellular phone account), as described in U.S. patent application Ser. No. 11/322,552, "Account Information Display For Portable Communication Device," filed Dec. 23, 2005, which is hereby incorporated by reference in its entirety.

Figure 5B:
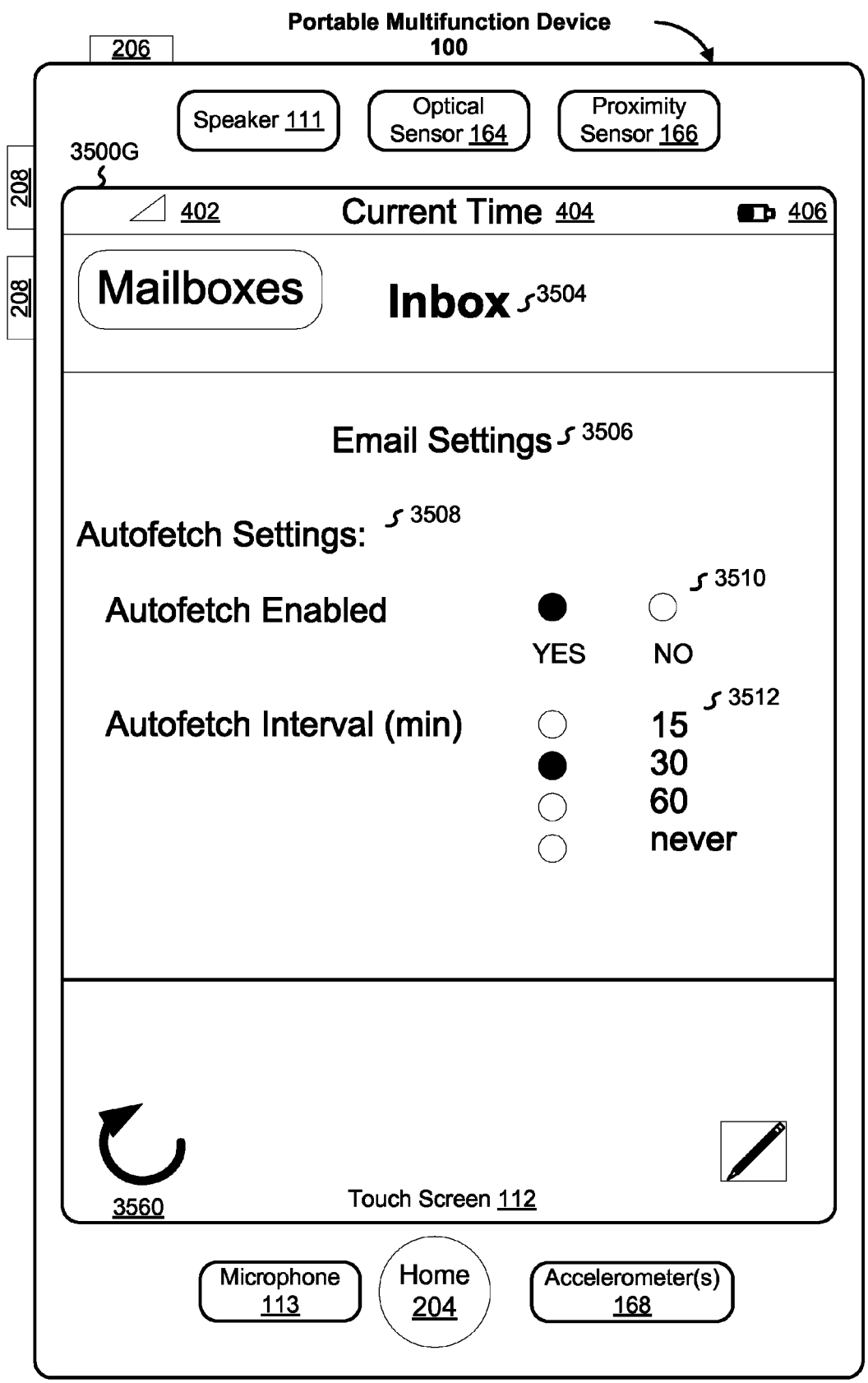

FIGS. 5A-5B illustrate exemplary interfaces of an email application for a portable multifunction device 100 with a touch screen display 112 in accordance with some embodiments. In particular, FIG. 5A illustrates an exemplary user interface 3500G of a portable multi-function device 100. The user interface 3500G displays contents of an email inbox 3504 by listing for each displayed email: the identity of the sender, a timestamp, a subject and a brief snippet from the email. The user interface 3500G can be employed with a portable multifunction device that, in some embodiments, includes a speaker 111, optical sensor 164, proximity sensor 166, touch screen 112, microphone 113, and accelerometer(s) 168, as described above, or a subset or superset of these features. Features of the user interface 3500G also include sensitivity to a deletion selection gesture 5102 and a deletion confirmation icon 5104.

The user interface 3500G is responsive to user contact with the touch screen 112, including gestures, such as touches, taps and swipes made with a finger, stylus, or other input device. The user interface 3500G is configured to detect a particular gesture by which a user selects for deletion a particular item from a list of items. In one embodiment, one possible selection gesture is a swipe (e.g., with a finger) over the individual item to be selected for deletion. Different embodiments can impose a range of conditions on the orientation and length of a swipe required to select a particular item. For example, in some embodiments a selection swipe can be in any direction or orientation with respect to the item to be selected—as long as the swipe travels over the item. In other embodiments, a selection swipe can only be along a row in which the item to be selected is displayed. Other gestures (individual or in combination) can also be employed to select an individual item consistent with the capabilities of a multifunction device 100 to identify for selection a particular item in response to a particular gesture.

In FIG. 5A, the user interface 3500G is illustrated as a user is in the process of viewing emails in the inbox 3504 and deleting an email 3506 from "Bob Adams" related to "Project Orion." In one embodiment, shown in FIG. 5A, the user deletes the email by first selecting it with a finger swipe 5102 and then confirming deletion of the email by activating/touching a Delete icon 5104 displayed for that purpose.

The displayed emails are fetched to the device 100 either manually, in response to user demand, or under control of the autofetch functionality 174 (FIG. 1C). If the autofetch functionality is enabled, emails are fetched by the device 100 in such a manner that: (1) the user is presented with fresh email when they expect it, and (2) battery power consumption due to communications with the email server and usage of CPU resources for email fetching, are reduced. This is accomplished in some embodiments by configuring the autofetch functionality 174 to fetch mail after different time periods and/or at different intervals depending on user interaction with the device 100 and the status/state of the email application. For example, as described with reference to FIGS. 1C and 1D, in some embodiments the autofetch functionality 174 can be programmed to fetch email at different intervals depending upon the occurrence of key events (e.g., email launch or device unlock), or the status of the email application (e.g., active or inactive).

By fetching email relatively quickly (e.g., in a minute or two) upon the occurrence of key email events, the user will have fresh email available in their inbox 3504 when they are likely to want to read it (such as when they have just launched the email application 140). Similarly, by fetching email at a longer interval (e.g., 5, 15, 30 or even 60 minutes) after a prior fetch, power consumption, communications bandwidth and microprocessor utilization are all comparatively reduced without frustrating user expectations. Further savings in all of these areas (power, bandwidth, CPU use) are obtained in some embodiments by autofetching email at a longer interval (e.g., 30 minute intervals) when the email application 140 is running in the background than when the email application 140 is running in the foreground (e.g., a shorter interval, such as 5 minutes, may be used when the email application is running in the foreground).

The events and states described herein are exemplary and can be modified as appropriate depending on the type of electronic device 100 in which autofetch is implemented, power consumption and network connectivity characteristics of the device 100, and user expectations of their email experience.

FIG. 5B illustrates an exemplary user interface 3500G of a portable multi-function device 100 configured to display and permit user modification of email settings 3506 in accordance with some embodiments. Specifically, FIG. 5B displays email settings 3506 that are related to the autofetch feature 174 described above. As shown, the autofetch settings 3508 include an "Autofetch Enabled" setting 3510 and an "Autofetch Interval" setting 3512, both of which can be set by a user (e.g., by the user selecting from among predefined options using radio buttons).

In some embodiments, the Autofetch Enabled setting 3510 can be set to "YES" (which enables autofetch functionality) or "NO" (which disables autofetch functionality meaning). When autofetch is enabled, the device 100 performs the operations described herein for automatically fetching email at different intervals according to specific email states and user events. In some embodiments, disabling autofetch functionality turns off all autofetch operations except in response to specific user fetch requests (e.g., manual fetching in response to a user gesture on fetch icon 3560, FIG. 5A). In other embodiments, disabling autofetch functionality turns off autofetching except for a few predefined situations, such as when the device 100 is unlocked or the email application 140 is launched.

In some embodiments, the user can set the Autofetch Interval 3512 to one of a set of predefined values. In the illustrated embodiment, the value of the Autofetch Interval 3512 is associated only with the third period 182-3, which is the period between fetches while the email application 140 is running in the background. This reflects the fact that users are likely to have differing views as to how often email should be fetched when the email module 140 is running in the background. In some embodiments, the Autofetch Interval can be set to 15, 30 or 60 minutes, or "never" (selected by the user to ensure that portable device 100 never fetches mails when the email application 140 is in the background). In different embodiments, any of the autofetch settings 181, including the time periods 182 and/or the predefined values 183, could be set in the same manner. These different embodiments would include user definable options in the Autofetch Settings window 3508 corresponding to autofetch settings 181 that are user definable. As described above for other GUIs, the GUI for autofetch settings 3508 can be implemented using a range of user interface elements, including text boxes, pulldown menus and touch sensitive dials and sliders. Methods of operation of the port discovery and autofetch functionality are now described.

Figure 6A:
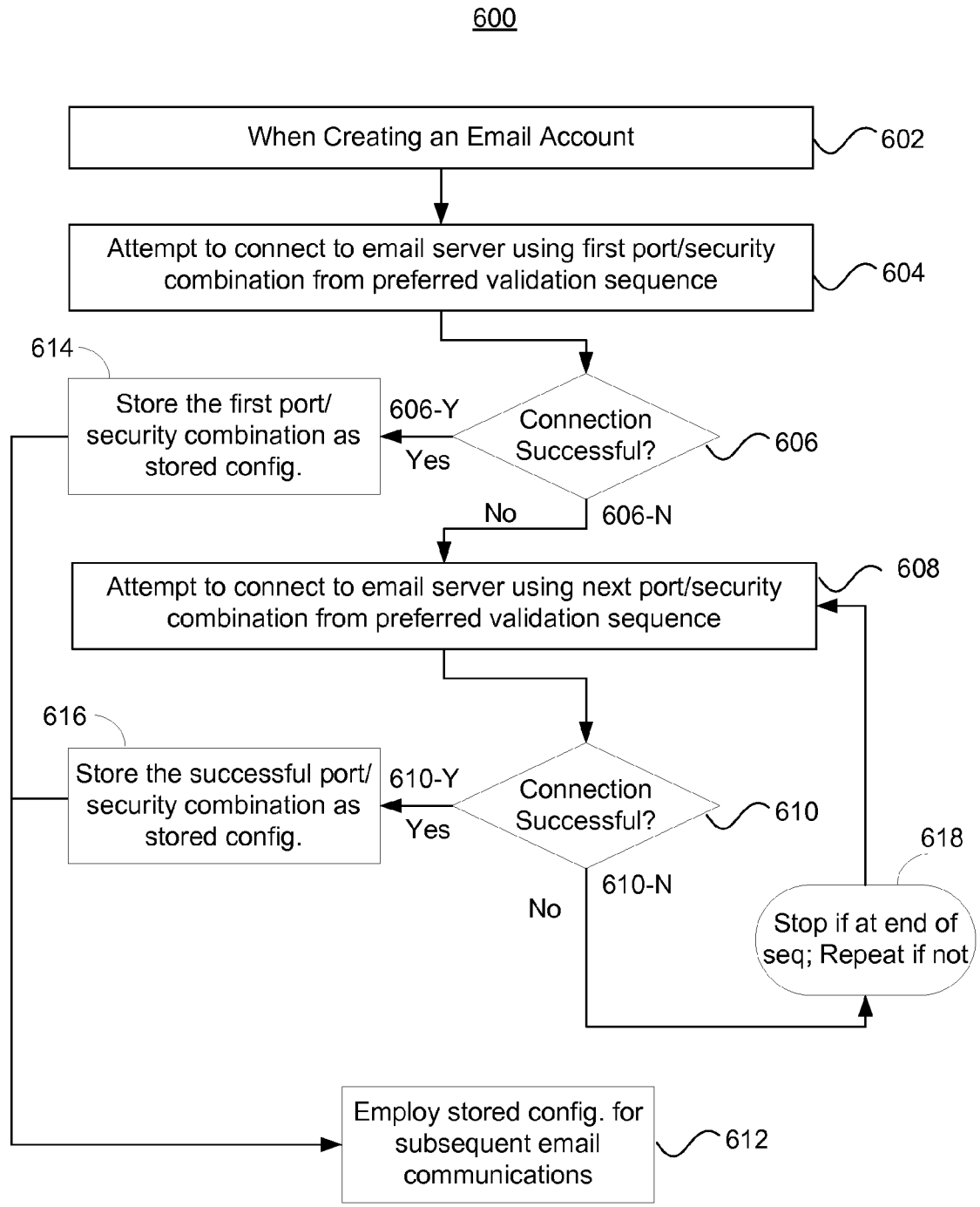
FIGS. 6A and 6B are flow diagrams illustrating an exemplary port discovery method in accordance with some embodiments.
Figure 6B:
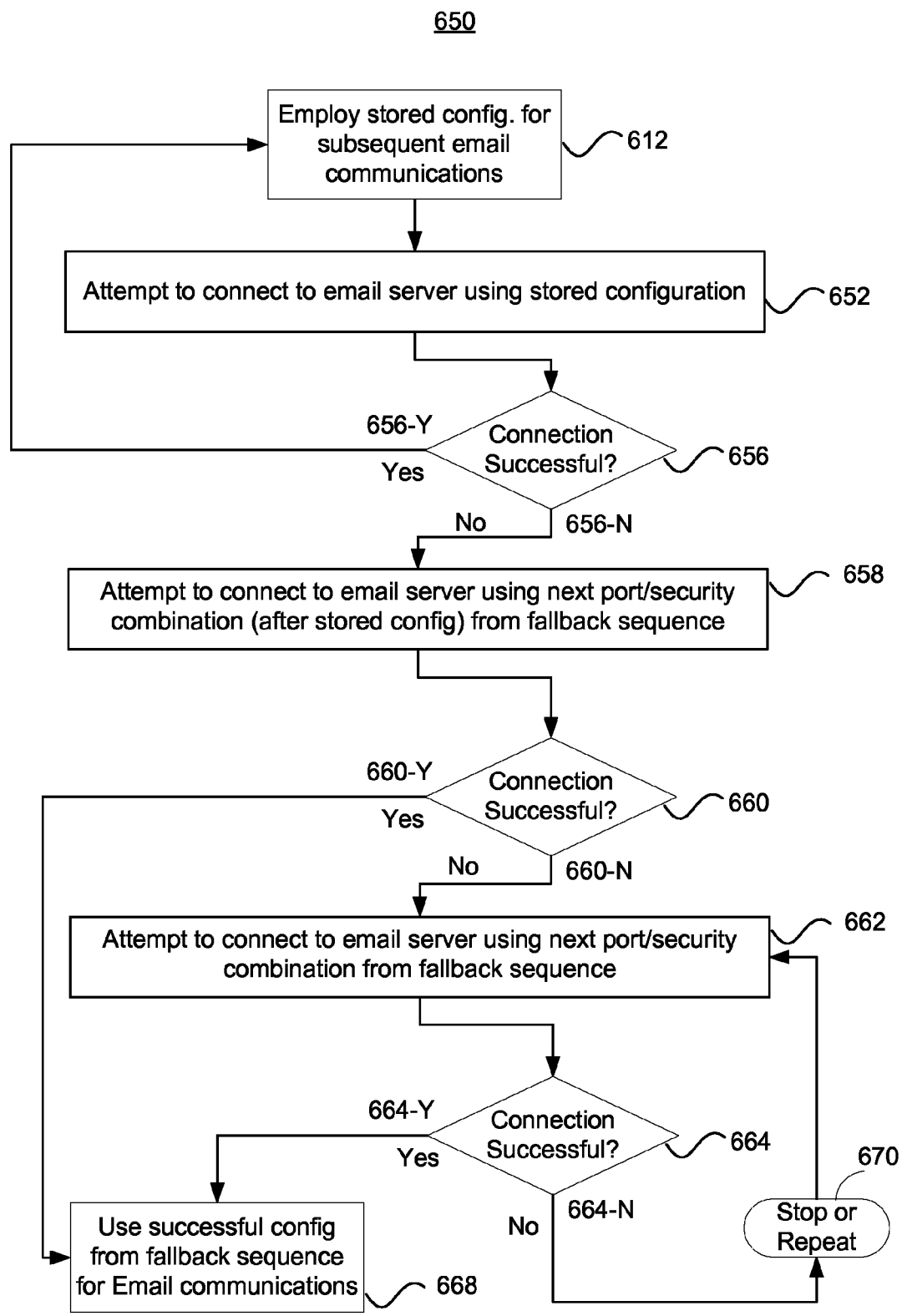

FIGS. 6A and 6B are flow diagrams illustrating exemplary port discovery and message delivery methods in accordance with some embodiments. The methods illustrated in these figures are, in one embodiment, implemented by the port discovery feature 175 of the email module 140 (see FIGS. 1C and 1D).

Referring to FIG. 6A, the port discovery method 600 is used when creating an email account on the portable device 100 (602). When creating an email account an attempt is first made to connect to a designated email server 199 using a first port/security combination from a preferred validation sequence 188 (604). For example, as illustrated in FIG. 1C, the first port/security combination tried would be port "587" with "SSL" security, which is the first, and most secure, setting in the validation sequence 188. If the portable device 100 is able to connect to the server 199 at the specified port with the specified security setting (606-Y), the successful port/security combination is stored as the stored configuration 185 (614). The stored configuration 185 is then used by the email module 140 as the port/security setting for subsequent email communications between the portable device 100 and the email server 199 (612). Given the validation sequence 188 of FIG. 1C, this would be the port and security combination with the strongest security for SMTP email.

If the connection with the first port/security combination is not successful (606-N), the portable device attempts to connect to the email server 199 with successively less secure port and security combinations (608). These other successive port and security combinations are selected from the validation sequence 188 (608) from positions following the first port/security combination. For example, the first combination tried after the "587/SSL") option would be the "587/START-TLS" combination. If the portable device 100 is able to connect to the server 199 at the specified port with the specified security setting associated with any of these secondary/alternative port security combinations (610-Y), the successful port/security combination is stored as the stored configuration 185 (616). As described above, the stored configuration 185 is used by the email module 140 as the default port/security setting for subsequent email communications between the portable device 100 and the email server 199 (612).

If a successful connection cannot be made with any of the secondary/alternative port/security combinations (610-N), the attempt to make an email connection is terminated (618). At this point, the process of port discovery can be repeated (604)—either automatically, after a predefined interval, or upon user request. Using this method, a default port and security setting for an email account is established automatically for a portable device 100. In some embodiments, depending on the arrangement of port/security combinations associated with the validation sequence, the port/security setting so determined is the strongest combination possible in view of capabilities of the portable device 100, the network 198, and the email server 199.

Referring to FIG. 6B, the fallback method 650 is used to establish a fallback connection to an email server when the stored network configuration does not work. Preferably, the stored configuration 185 is used by the email module 140 as the port/security setting for all email communications between the portable device 100 and the email server 199 (612). Thus an attempt is always made to connect to the email server using the stored configuration (652) and it is used when available (656-Y). However, it is possible that, from time to time, attempts to connect to the server with the stored configuration are not successful (656-N).

In this case, an attempt is first made to connect to a designated email server 199 using a first fallback port/security combination from the fallback sequence 190 (658). As described above, in some embodiments the first fallback combination tried is the entry in the fallback sequence 190 immediately following the entry in the fallback sequence 190 that matches the stored configuration 185. If the portable device 100 is able to connect to the server 199 using the port number and security setting specified by the first fallback combination (660-Y), that fallback combination is used for that email session (668). In some embodiments, the successful fallback combination is not stored for future use—this reflects a preference of the port discovery functionality 175 to default to the most secure configuration that is known to work (i.e., the stored configuration).

In different embodiments, a successful fallback combination could be stored for future use if the device 100 repeatedly fails to connect using the stored configuration 185 (perhaps reflecting degraded network capabilities). Note that a failure to connect with the stored configuration 185 could also reflect increased network security requirements—for example, a network that starts requiring SSL security. The device 100 could be adapted to this network change by re-executing the port discovery method 600, which would discover the availability of the more secure network configuration.

If the connection with the first fallback combination is not successful (660-N), the portable device 100 attempts to connect to the email server 199 with successively less secure port and security combinations (662). As already described, these other port and security combinations are selected from the fallback sequence 188 (662) from positions following the first fallback combination. If the portable device 100 is able to connect to the server 199 at the specified port with the specified security setting associated with any of these secondary/alternative fallback combinations (664-Y) that fallback combination is used for that email session (668) and, as noted above, is not stored.

If a successful connection cannot be made with any of the secondary/alternative fallback combinations (664-N), the attempt to make an email connection is stopped (670).

Figure 7:
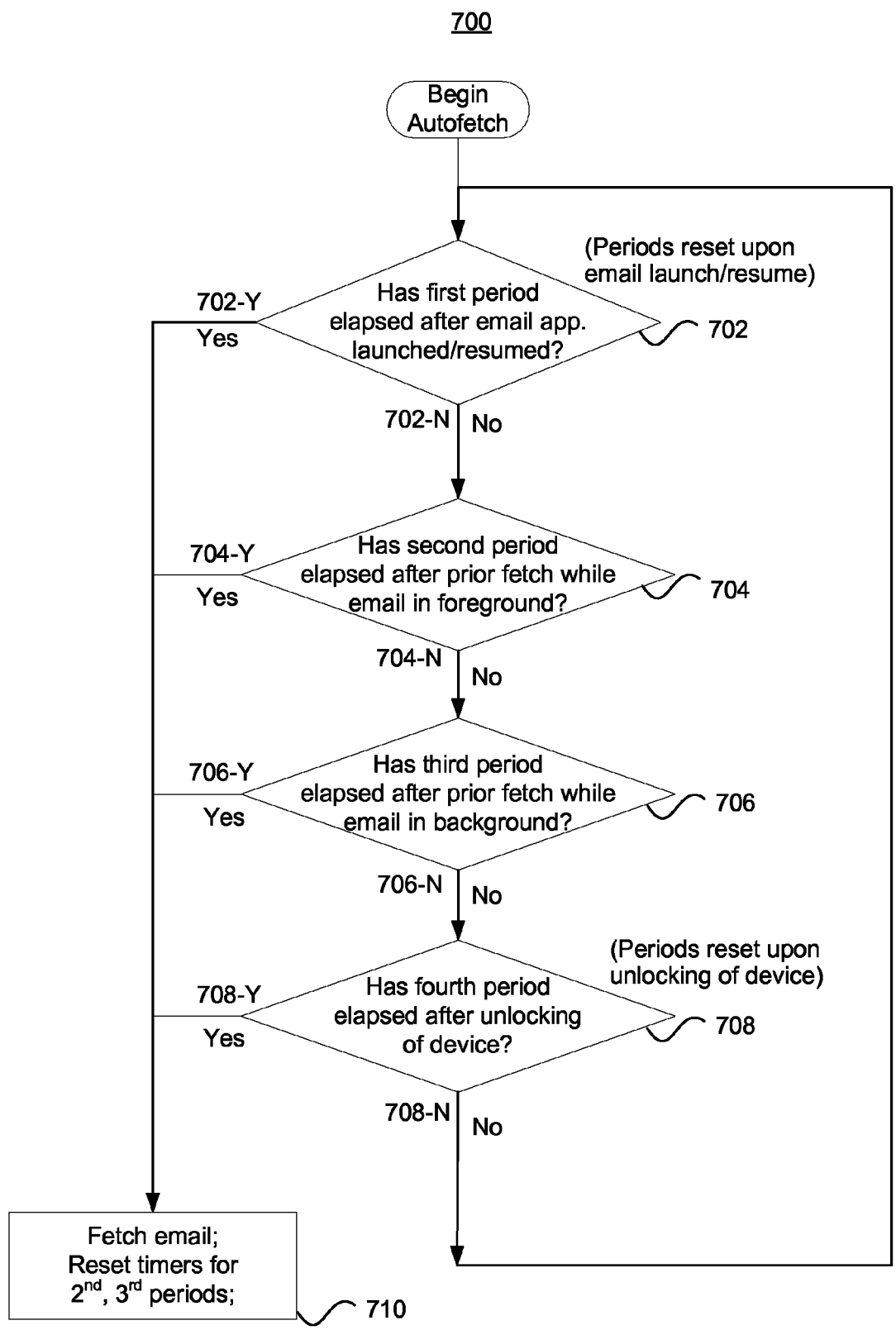
FIG. 7 is a flow diagram illustrating an exemplary method for fetching email to a portable electronic device in accordance with some embodiments.

FIG. 7 is a flow diagram illustrating an exemplary method 700 for fetching email to a portable electronic device in accordance with some embodiments. In some embodiments, the method involves fetching email from an email server (710) upon the occurrence of any one of the following conditions:

expiration of a first period of time after activation of the email application (702);

expiration of a second period of time after a prior email fetch while the email application is running in the foreground on the portable electronic device (704);

expiration of a third period of time after the prior email fetch while the email application is running in the background on the portable electronic device (706); or expiration of a fourth period of time after unlocking of the portable device (708).

As shown in FIG. 7, a fetch is performed when any of tests described above are true (702-Y, 704-Y, 706-Y, 708-Y). When one test fails (702-N, 704-N, 706-N, 708-N), the next test is attempted, including, in some embodiments, the first test (702) when the last test (708) fails (708-N). In some embodiments, the method 700 can be run repeatedly, until a fetch occurs, or it can be run periodically. Though the condition tests 702-708 are shown in a particular order, there is no requirement that these tests are performed in any preset order (though they can be).

In some embodiments, the first time period is reset (and optionally, the second and third periods) anytime email is launched or resumed; the fourth period is reset (and optionally, the second and third periods) anytime the device 100 is unlocked; and the second and third periods are reset anytime email is fetched.

In some embodiments, power consumption of the device 100 is optimized/reduced by setting the third period to be substantially longer than the second period, which ensures that mail is fetched less frequently when the email module 140 is running in the background than in the foreground. Additional power savings are achieved, consistent with satisfying user expectations that email is fresh when he/she is ready to read it, by setting the refresh periods (i.e., the second and third periods) to values that are relatively longer than the first and fourth periods. Consistent with user expectations, the first and fourth periods are set such that new email is fetched near the time when the email module 140 is launched or resumed, or the device 100 is unlocked. These considerations are reflected in one embodiment, where the first, second, third and fourth periods are set, respectively, to 1 minute, 5 minutes, 15 minutes, and 1 minute.

In some embodiments, the method 700 is performed continually so that email is repeatedly fetched upon occurrence of the next one of the conditions set out at operations 702-708.

In some embodiments, any one of the first, second, third or fourth periods of time is user-definable.

In some embodiments, the first, second, third, and fourth periods of time are adapted to reduce network bandwidth employed by the portable electronic device due to the fetching of the email. The principles of making adjustments to reduce bandwidth are similar to those described for reducing power consumption of the device 100, and also must be consistent with user expectations as to the availability of fresh email.

The foregoing description, for purpose of explanation, has been described with reference to specific embodiments. However, the illustrative discussions above are not intended to be exhaustive or to limit the invention to the precise forms disclosed. Many modifications and variations are possible in view of the above teachings. In addition, operations shown in flow charts used to illustrate embodiments of various methods do not necessary need to be performed in the order shown, and subsets or supersets of those operations may be implemented in accordance with the above teachings. The embodiments were chosen and described in order to best explain the principles of the invention and its practical applications, to thereby enable others skilled in the art to best utilize the invention and various embodiments with various modifications as are suited to the particular use contemplated.

What is claimed is:

1. A computer-implemented method, comprising:
    at a portable electronic device configured with an email client:
    (1) when creating an email account on the portable electronic device:
        (a) attempting to connect to an outbound email server using a first port/security combination according to a first preferred sequence of port/security combinations;
        (b) if connection is made using the first port/security combination, storing the first port/security combination as a stored configuration for the email account;
        (c) if connection is not made using the first port/security combination, repeatedly attempting to connect to the outbound email server using second port/security combinations distinct from the first port/security combination according to the first preferred sequence until connection is made with a particular second port/security combination; and
        (d) storing the particular second port/security combination as the stored configuration; and
    (2) subsequently employing the stored configuration to connect to and send email via the outbound email server.

2. The computer-implemented method of claim 1, wherein attempting to connect to the outbound email server comprises connecting to a network between the portable device and the outbound email server and initiating a session on the email server.

3. The computer-implemented method of claim 2, wherein initiating an email session comprises at least one of: logging-in to the email server or confirming that the email server is an SMTP email server.

4. The computer-implemented method of claim 1, wherein the first preferred sequence of port/security combinations comprise a plurality of combinations of predefined port numbers and security settings associated with SMTP email servers.

5. The computer-implemented method of claim 1, wherein the first preferred sequence is arranged from highest to lowest security strength.

6. The computer-implemented method of claim 1, wherein the first preferred sequence of port/securing setting comprises:
    1. 587/SSL,
    2. 587/STARTTLS,
    3. 25/SSL,
    4. 25/STARTTLS,
    5. 465/SSL,
    6. 465/STARTTLS,
    7. 587/no SSL or STARTTLS,
    8. 25/no SSL or STARTTLS,
    9. 465/no SSL or STARTTLS.

7. The method of claim 1, further comprising:

(3) when the portable device cannot subsequently connect to the outbound email server using the stored configuration:
  (a) attempting to connect to the outbound email server using a first fallback port/security combination according to a fallback sequence of port/security combinations that is different from the first preferred sequence, wherein the first fallback port/security combination is different from the stored configuration;
  (b) upon determining that connection is made using the first fallback port/security combination, employing the first fallback port/security combination to send email via the outbound email server;
  (c) upon determining that connection is not made using the first fallback port/security combination, attempting to connect to the outbound email server using second fallback port/security combinations distinct from the first fallback port/security combination according to the fallback sequence until connection is made with a particular second fallback port/security combination that is different from the stored configuration; and
  (d) employing the particular second fallback port/security combination to send email via the outbound email server.

8. The method of claim 7, further comprising:
upon determining that a connection is not made to the outbound email server via either of (2) or (3), suspending an attempt to send email via the outbound email server.

9. The method of claim 7, wherein the fallback sequence comprises a reordering of the first preferred sequence such that an account configured for email communications using a secure port/security combination does not fallback to a less secure port/security combination.

10. The method of claim 9, wherein the fallback sequence is further configured such that either of the first or second fallback port/security combinations have less security strength than the stored configuration.

11. The method of claim 7, further comprising storing the fallback sequence.

12. The method of claim 7, further comprising, storing a plurality of fallback sequences, each fallback sequence corresponding to at least one of the port/security combinations in the first preferred sequence.

13. The method of claim 7, wherein the fallback sequence comprises:
  1. 587/no SSL or STARTTLS,
  2. 25/no SSL or STARTTLS,
  3. 465/no SSL or STARTTLS,
  4. 587/SSL,
  5. 587/STARTTLS,
  6. 25/SSL,
  7. 25/STARTTLS,
  8. 465/SSL,
  9. 465/STARTTLS.

14. A portable computing device, comprising:
a display;
one or more processors;
memory; and
one or more programs, wherein the one or more programs are stored in the memory and configured to be executed by the one or more processors, the one or more programs including:
an email application; and
instructions for setting ports and security level for an email account, comprising:
  (1) when creating an email account on the portable electronic device:
    (a) attempting to connect to an outbound email server using a first port/security combination according to a first preferred sequence of port/security combinations;
    (b) if connection is made using the first port/security combination, storing the first port/security combination as a stored configuration for the email account;
    (c) if connection is not made using the first port/security combination, repeatedly attempting to connect to the outbound email server using second port/security combinations distinct from the first port/security combination according to the first preferred sequence until connection is made with a particular second port/security combination; and
    (d) storing the particular second port/security combination as the stored configuration; and
  (2) subsequently employing the stored configuration to connect to and send email via the outbound email server.

15. A computer readable non-transitory storage medium storing one or more programs, the one or more programs comprising instructions, which when executed by a portable computing device with an email client, cause the device to perform the following:
  (1) when creating an email account on the portable electronic device:
    (a) attempt to connect to an outbound email server using a first port/security combination according to a first preferred sequence of port/security combinations;
    (b) if connection is made using the first port/security combination, store the first port/security combination as a stored configuration for the email account;
    (c) if connection is not made using the first port/security combination, repeatedly attempt to connect to the outbound email server using second port/security combinations distinct from the first port/security combination according to the first preferred sequence until connection is made with a particular second port/security combination; and
    (d) store the particular second port/security combination as the stored configuration; and
  (2) subsequently employ the stored configuration to connect to and send email via the outbound email server.

16. A portable electronic device with a touch screen display and an email client, comprising means for:
  (1) when creating an email account on the portable electronic device:
    (a) attempting to connect to an outbound email server using a first port/security combination according to a first preferred sequence of port/security combinations;
    (b) if connection is made using the first port/security combination, storing the first port/security combination as a stored configuration for the email account;
    (c) if connection is not made using the first port/security combination, repeatedly attempting to connect to the outbound email server using second port/security combinations distinct from the first port/security combination according to the first preferred sequence until connection is made with a particular second port/security combination; and
    (d) storing the particular second port/security combination as the stored configuration; and (2) subsequently employing the stored configuration to connect to and send email via the outbound email server.

17. The portable computing device of claim 14, wherein the first preferred sequence is arranged from highest to lowest security strength.

18. The portable computing device of claim 14, the instructions for setting ports and security level for an email account further comprising:
  (3) when the portable device cannot subsequently connect to the outbound email server using the stored configuration:
    (a) attempting to connect to the outbound email server using a first fallback port/security combination according to a fallback sequence of port/security combinations that is different from the first preferred sequence, wherein the first fallback port/security combination is different from the stored configuration;
    (b) upon determining that connection is made using the first fallback port/security combination, employing the first fallback port/security combination to send email via the outbound email server;
    (c) upon determining that connection is not made using the first fallback port/security combination, attempting to connect to the outbound email server using second fallback port/security combinations distinct from the first fallback port/security combination according to the fallback sequence until connection is made with a particular second fallback port/security combination that is different from the stored configuration; and
    (d) employing the particular second fallback port/security combination to send email via the outbound email server.

19. The computer readable non-transitory storage medium of claim 15, wherein the one or more programs comprising instructions, which when executed by the portable computing device with the email client, further cause the device to perform the following:
  (3) when the portable device cannot subsequently connect to the outbound email server using the stored configuration:
    (a) attempting to connect to the outbound email server using a first fallback port/security combination according to a fallback sequence of port/security combinations that is different from the first preferred sequence, wherein the first fallback port/security combination is different from the stored configuration;
    (b) upon determining that connection is made using the first fallback port/security combination, employing the first fallback port/security combination to send email via the outbound email server;
    (c) upon determining that connection is not made using the first fallback port/security combination, attempting to connect to the outbound email server using second fallback port/security combinations distinct from the first fallback port/security combination according to the fallback sequence until connection is made with a particular second fallback port/security combination that is different from the stored configuration; and
    (d) employing the particular second fallback port/security combination to send email via the outbound email server.

20. The computer readable non-transitory storage medium of claim 19, wherein the fallback sequence comprises a reordering of the first preferred sequence such that an account configured for email communications using a secure port/security combination does not fallback to a less secure port/security combination.

* * * * *